(12) United States Patent
Vichare et al.

(10) Patent No.: US 8,521,443 B2
(45) Date of Patent: Aug. 27, 2013

(54) METHOD TO EXTRACT PARAMETERS FROM IN-SITU MONITORED SIGNALS FOR PROGNOSTICS

(75) Inventors: Nikhil M. Vichare, Austin, CA (US); Michael G. Pecht, Hyattsville, MD (US)

(73) Assignee: Oxfordian, Dallas, TX (US)

( * ) Notice: Subject to any disclaimer, the term of this patent is extended or adjusted under 35 U.S.C. 154(b) by 591 days.

(21) Appl. No.: 12/587,737

(22) Filed: Oct. 13, 2009

(65) Prior Publication Data

US 2010/0100337 A1   Apr. 22, 2010

Related U.S. Application Data

(60) Provisional application No. 61/196,261, filed on Oct. 16, 2008.

(51) Int. Cl.
*G01B 3/52* (2006.01)
*G06F 17/18* (2006.01)

(52) U.S. Cl.
USPC ............... 702/34; 702/35; 702/36; 702/179; 702/183

(58) Field of Classification Search
USPC ............. 702/121–123, 179–189, 34–36
See application file for complete search history.

(56) References Cited

U.S. PATENT DOCUMENTS

| | | | |
|---|---|---|---|
| 5,210,704 | A | 5/1993 | Husseingy |
| 6,748,341 | B2 | 6/2004 | Crowder |
| 7,024,315 | B2 | 4/2006 | Giurgiutiu |
| 7,277,823 | B2 | 10/2007 | Harrison |
| 7,328,128 | B2 | 2/2008 | Bonanni et al. |
| 7,333,917 | B2 | 2/2008 | Greis et al. |
| 2003/0074173 | A1* | 4/2003 | Monroe ................... 703/13 |
| 2009/0062933 | A1* | 3/2009 | Eryurek et al. ............ 700/12 |

OTHER PUBLICATIONS

Prognostics and Helath Management of Electronics, IEEE Transactions on Components and packaging Technologes, vol. 29, No. 1, Mar. 2006, pp. 222-229.
Environment and Usage Monitoring of Electronic Products for Health Assessment and Product Design, Journal Qual Tech and Quantitative Management, vol. 4, No. 2, 2007, pp. 79-94.
In-Situ Temp Measuret of a Notebook Computer—A Case Study in Health and Usage Monitoring of Elect, IEEE Trans on Device and Materials Reliability, vol. 4., No. 4, pp. 658-663, 2004.
The Physics-of-Failure Approach at the Univ of Md for the Devel of Reliable Electronics, Proc. Third International Conf. on Thermal and Mechanical Simulation 2002, pp. 10-17.
A Life Consumption Monitoring Methodology for Electronic Systems, IEEE Transactions on Components and Packaging Technologies, vol. 26, No. 3, Sep. 2003, pp. 625-634.

(Continued)

*Primary Examiner* — Phuong Huynh
(74) *Attorney, Agent, or Firm* — Lawrence Edelman; The Law Office of Lawrence Edelman

(57) ABSTRACT

Through the methods of this invention, prognostics tools are provided to more efficiently and more accurately predict when a component product may fail. In a first embodiment a method is described whereby a number of environmental factors are monitored, the provided sensors obtaining raw data, variations in said raw data measured, the parameters of interest extracted and binned according to predetermined criteria, with the raw data thereafter discarded. In a second embodiment of the invention, the same sensor readings are recorded along with the performance characteristics for the component/product and compared to estimated performance for the product. The performance drift is then observed, whereby in monitoring said drift, trends may be determined and time or cycles to failure predicted.

22 Claims, 19 Drawing Sheets

High-level block diagram of load parameter extraction method of Fig. 5A

(56) References Cited

OTHER PUBLICATIONS

Wireless Sensor Networks a Survey, Journal of Computer Networks, vol. 38, 2002, pp. 393-422.
Embedding Damage Detection Algorithms in a Wireless Sensing Unit for Operational Power Efficiency, Journal of Smart Materials and Structures, vol. 13, 2004, pp. 800-810.
Methodologies for Predicting Fatigue Life, Journal of Materials, Jul. 1997, pp. 46-51.
Rainflow Cycles in Gaussian Loads, Fatigue and Fracture of Engineering Materials and Structures, vol. 15, No. 1, 1992, pp. 57-72.
Algorithm of Rainflow Method, The Rainflow Method in Fatigue, Butterworth-Heinmann, Oxford, pp. 11-20, 1991.
Methods for Binning and Density Est of Load Parameters for Prognostics and Health Management, Int Journal of Performability Engineering, vol. 2, No. 2, Apr. 2007, pp. 149-161.

\* cited by examiner

FIG. 1 Prognostic approach by using in-situ monitored environmental and usage temperature data.

Data reduction methods can potentially eliminate dwell regions

Reduces noise using moving average filter

Eliminates monotonic data patterns and merges small ranges into overall data streams Identifies dwells temperatures and time using ramp-rate and range Scans the time-temperature data to extract cyclic load parameters Approach for binning and density estimation of monitored load parameters

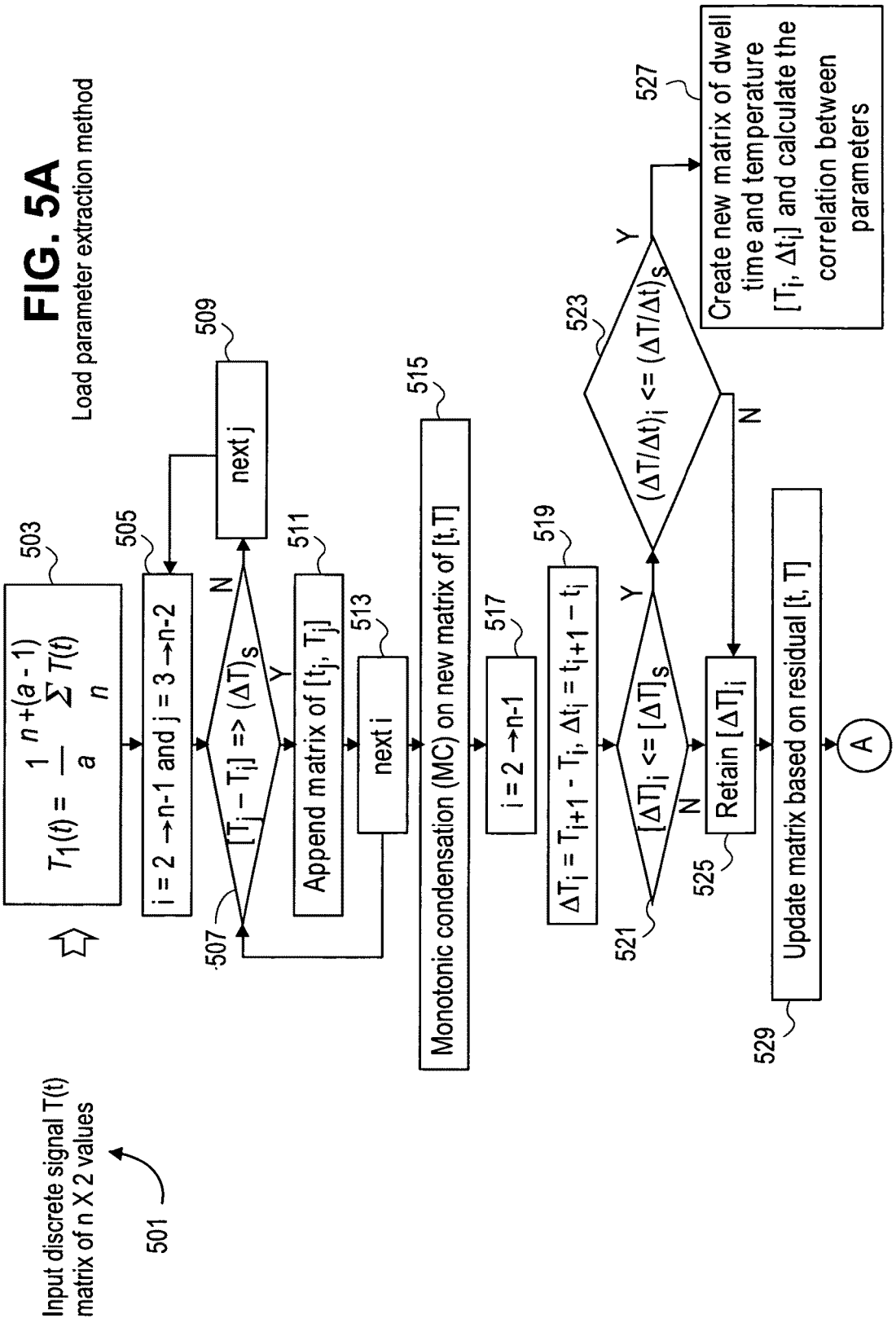

High-level block diagram of load parameter extraction method of Fig. 5A

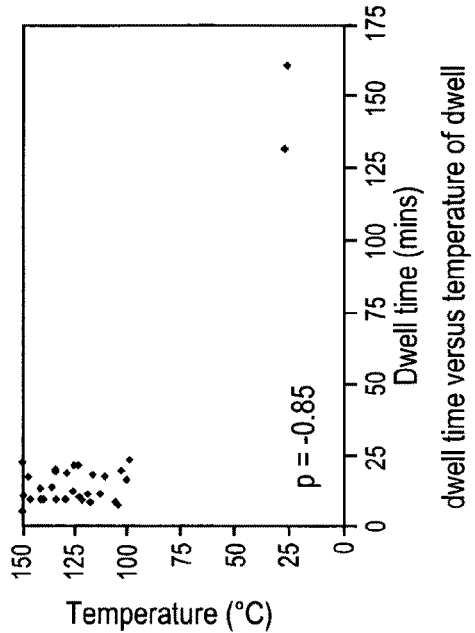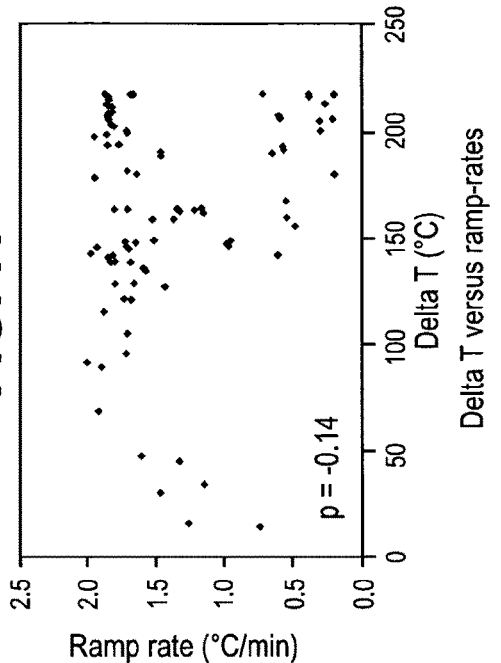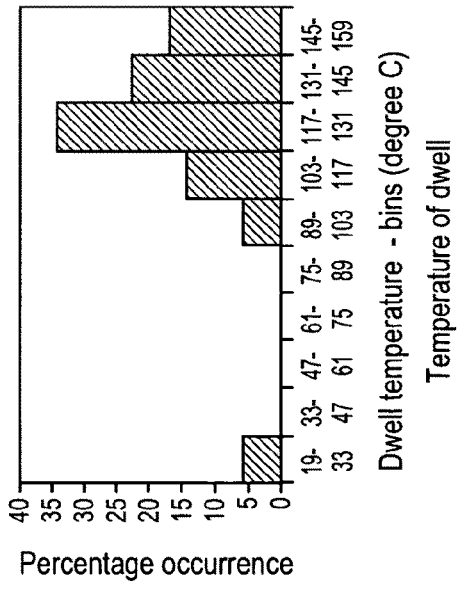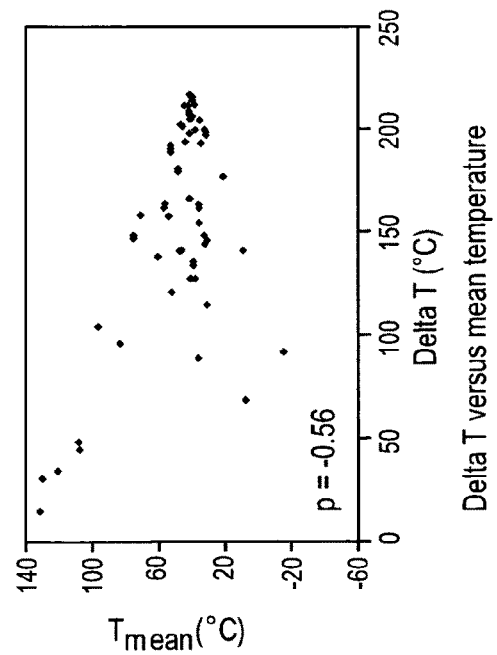

No indication of degradation before the occurrence of the first spike

Change in resistance with temperature

Approach for precursor identification and tracking using performance drift values Second order polynomial fit between temperature and resistance Trending mean values of resistance drift Trending mean-peak values of resistance drift Trending values of standard deviation of resistance drift Trending values of 95% cumulative distribution values of resistance drift Trending values of 95% cumulative distribution peaks of resistance drift Trending skewness of values of resistance drift Trending kurtosis values of resistance drift Trending skewness peak values of resistance drift Failure prediction using two features

METHOD TO EXTRACT PARAMETERS FROM IN-SITU MONITORED SIGNALS FOR PROGNOSTICS

CROSS REFERENCE TO RELATED APPLICATION

This application claims priority to Provisional U.S. Patent Application Ser. No. 61/196,261, filed Oct. 16, 2008, for the invention entitled Method to Extract Parameters from in-situ Monitored Signals for Prognostics, the entire contents of which application is incorporated herein by reference.

BACKGROUND OF THE INVENTION

1. Field of the Invention

This invention relates generally to prognostics, and more particularly to methods for processing in-situ monitored sensor data for health assessment and remaining life predictions of products and systems.

2. Description of the Related Art

There has been a growing interest in monitoring the ongoing "health" of products and systems. Here, health assessment includes evaluation of the extent of degradation or deviation from an expected normal condition. Prognostics is the process of predicting the time to failure of a part or system based on assessment of health conditions. Prognostics and health management (PHM) is a method that permits the reliability of a system to be evaluated with respect to the actual life-cycle conditions, to predict the advent of failure, and thus to mitigate system risks.

The PHM methods process uses sensor data and other signals, and product environmental and operational information to extract parameters that can be used to meet several important applications such as to provide an early warning of failure, to forecast maintenance requirements as needed: avoid scheduled maintenance and extend maintenance cycles, to assess the potential for life extensions, to reduce amount of redundancy, to provide guidance for system reconfiguration and self-healing, to provide efficient fault detection and identification, including evidence of "failed" equipment found to function properly when re-tested (no-fault found), and to improve future designs and qualification methods. Other applications in product screening, qualification and warranty assessment are also possible.

Implementation of prognostics and health assessment techniques involves monitoring and processing of environmental and operational loads, and performance parameters to assess the health of the product. Typical environmental loads can include temperature, vibrations, shock, pressure, acoustic levels, strain, stress, inert environments, humidity levels, and contamination. Operational loads include usage frequency, usage severity, duty cycle, power, heat dissipation, current, voltage, and mechanical loads such as force, torsion, pressure etc. Performance parameters are the measure of the product's or system's performance and can include power, efficiency, voltage, resistance, RF signal strength, throughput or any parameters specific to the product or system under consideration.

Life cycle environmental and operational loads, both individually or in various combinations, may lead to performance or physical degradation of the product and subsequently reduce its service life. The extent and rate of product degradation depends upon the product and the nature, magnitude, and duration of exposure to these loads. The damage inflicted, and hence the "life" of the product consumed can be assessed by monitoring and processing the load and performance data in real time, and correlating it with governing failure models, such as physics-of-failure based stress and damage models.

The data can be monitored using sensors embedded in the product or systems or autonomous sensor systems retro-fitted to the systems. Other data may be obtained from operation and performance conditions. The processing of data can be achieved by various methods including, 1) onboard processing in real time, 2) transferring data to external (base-station) databases or centralized servers, and 3) using intermediate processing on sensor nodes embedded with processing capabilities to enable transmitting fewer amounts of data (processed instead of raw data) to a base station.

Data simplification is a way to obtain gains in computing speed and testing time, condense load histories without sacrificing important damage characteristics, preserve the interaction of load parameters, and provide an estimate of the error introduced by reducing and simplifying the data. Data simplification can be achieved using a variety of tools such as filters, Fourier transforms, wavelets, Hayes method, ordered overall range (OOR), etc.

Besides, data simplification it is often necessary to process the "raw" data (e.g. from sensors) to make it compatible with the damage models and algorithms needed to conduct prognostics. In particular, it may be necessary to extract relevant load parameters. Load parameters (single or multiple) measure for example, the magnitude and/or intensity of a load. To illustrate, in the case of vibration loading, the frequency of vibration, and vibration g-forces would be specific load parameters. Other examples include cyclic mean, amplitudes, ramp rates, hold periods, etc. Methods used to extract load parameters from a given set of load data/signals are referred to as load parameter extraction methods. Commonly used load parameter extraction methods include: cycle counting algorithms for extracting cycles from time-load signal, Fast Fourier transforms (FFT) for extracting the frequency content of signals, etc. Depending on the application and type of signal, custom load extraction methods may be required.

FIG. 1 is an exemplary schematic of in-situ monitoring, pre-processing, and storage of environmental and usage loads. A time (t)-temperature (T) signal is monitored in-situ using sensors, and further processed to extract (in this case) cyclic temperature range ($\Delta T$), cyclic mean temperature ($T_{mean}$), ramp rate (dT/dt), and dwell time ($t_D$) using embedded load extraction algorithms. The extracted load parameters are then stored in appropriate bins to achieve further data reduction. The binned data is downloaded to estimate the distributions of the load parameters for use in damage assessment, remaining life estimation, and the accumulation of product usage history.

The applications and limitations of existing methods for extracting load-time parameters will now be described, including the Hayes method, Ordered Overall Range (OOR), Peak counting, and Rainflow counting. Hayes' method identifies small ranges which are interruptions of a larger range. An interruption is found for a peak-valley pair when the next peak is higher than the current peak. An interruption is found for a valley-peak pair when the next valley is lower than the current valley. Once damage is calculated for these cycles, they are screened out of the original block of data, producing the abbreviated blocks. The procedure is repeated to cover all blocks.

The OOR method (also called the Racetrack method) converts irregular data into sequences of peaks and valleys by eliminating small reversals using a screening level. Peaks and valleys that were originally separated by smaller interrupting ranges now become adjacent, creating larger overall ranges.

Peak Counting records relative maxima and minima in the load history and their load levels. Generally only peaks and valleys above and below preset reference levels are counted. Similar to level crossing, the most damaging cycle is recorded between the largest peak and valley. In Rainflow Counting two consecutive ranges are considered together. Based on a set of rules, the algorithm scans the entire time-load history to identify full cycle and half cycles. The Rainflow method provides the mean stress in addition to the stress range during counting.

In terms of prognostic assessment, a method which includes calculating an accumulated damage estimate for a component via a diagnostics function is reported by Bonanni, et al., U.S. Pat. No. 7,328,128. Greis, et al., U.S. Pat. No. 7,333,917 reports a novelty detection system that may determine whether the novel state is indicative of normal operation or of a potential abnormal operation. A neural network based model has been proposed by Harrison, et al., U.S. Pat. No. 7,277,823 Several other ideas have been reported on performing prognostics on specific systems such as machinery (Crowder, Jr., U.S. Pat. No. 6,748,341) and gear-box and rotating equipment (Husseiny, U.S. Pat. No. 5,210,704). Other ideas utilize special sensor hardware such as thin piezoelectric sensors (Giurgiutiu, U.S. Pat. No. 7,024,315).

Limitations of Existing Methods

None of the methods noted above provide a generic method to analyze combined operational, environmental, and performance data to provide the prognostic assessment. The specific limitations with existing load extraction methods for application in prognostics and health assessment include the failure to extract ramp rates and dwell time, the need for smart data reduction and filtering techniques, and the need for assessing correlation of load parameters, as is discussed below.

a. Extracting Ramp Rates and Dwell Information

The existing load extraction methods provide the load range and mean load. These parameters may be adequate parameters for single fatigue life estimation in elastic-plastic fatigue analysis of materials. However, for example, in case of thermal-fatigue loads (frequently observed in electronic systems), wherein the damage is characterized by plastic yielding and creep deformations, the estimation of dwell time and ramp rates is required in addition to the stress range and mean stress for accurate fatigue assessment. Ramp rates can be estimated with modifications in the Rainflow algorithm. However, extracting dwell times and corresponding load levels is more challenging since it depends on both the amplitude and ramp rate of the monitored load cycles.

b. Concerns with Data Reduction

Analysis of complex load histories typically involves a data reduction stage to enable efficient data processing and to eliminate undesired load reversals. However, data reduction methods may also eliminate important load information and omit the extraction of certain load parameters in subsequent stages. For example the Ordered Overall Range (OOR) can eliminate small cycles (as a fraction of large cycles) by choosing an appropriate value of S-parameter (S<1). However, in the process it also eliminates dwell-time information. In FIG. 2, the points and connecting lines in light shade depict the original data before reduction. The dark solid line connecting the end points depicts the results obtained after OOR. The dwell time load information (0.2 hours of at 60° C.) is critical to assess the damage due to creep mechanisms at various locations on the electronic assembly such as solder joints, plated through holes, and die-attaches. Yet, this information is discarded in the analysis process.

c. Correlation of Load Parameters

Distributions of in-situ monitored temperature load parameters can be randomly sampled and used with the damage model in a Monte Carlo simulation. For accurate damage assessment the correlation between load parameters is important. Quantifying and using the correlations for damage assessment, enables the generation of realistic scenarios during random sampling. For example, the distributions of measured $\Delta T$ and $T_{mean}$ can be used for assessing the solder joint damage due to cyclic thermal loading. However, it is essential to know the correlation between these two parameters, as cycles with small $\Delta T$ but higher $T_{mean}$ values will cause more damage than the cycles with same $\Delta T$ values but lower $T_{mean}$.

SUMMARY OF THE INVENTION

With reference to the above, it is clear that there is a need for a novel prognostic method that can at a minimum 1) enable significant reduction of large amounts of irregular time-load (e.g. temperature) data without compromising features that are essential for damage estimation, 2) filter load (e.g. temperature) parameters based on their significance in defined damage models, 3) extract parameters such as ramp rate and dwell time in addition to cyclic range and means, that are not obtained from currently reported methods, 4) estimate the correlation between load parameters to enable accurate damage assessment, and 5) optimally bin parameters for use with Gaussian kernel functions in estimating the probability density of the data. The details of the methodology of the invention are presented in the Detailed Description. Also reported is the application of the analytical methodologies of the invention to measured field data as an improved tool for failure prediction.

In a first aspect of the invention, environmental and operational loads on a product or system are monitored. The monitored load data is then analyzed using load parameter extraction methods, with the previously stored raw data discarded after completion of the analysis steps. In a second aspect of the invention, environmental and operation load data is combined with performance data. The relationship between performance and load is established using a separately developed mathematical model. This model is then used to estimate performance at a given load input (e.g. such as an environmental or operational load input). By measuring the drift in performance (a comparison of estimated with actual performance) degradation in performance over time can then be identified. Statistical features obtained from the distribution of the model output are trended to assess degradation and predict remaining life.

The methods of this invention are not dependant on any specific type of sensor, but rather data captured in some time-series manner to extract load parameters. The prognostic methods discussed hereinafter in the Detailed Description can be used to provide estimates of remaining life in absence of any indications of failure or any data suggesting faults or anomalies prior to failure. The estimates can be derived after some period of elapsed time (e.g. a few seconds, minutes, hours or days) of exposure in the field, as opposed to several months or years, although in certain applications (space flight, oil drilling, and others), longer time estimates may advantageously this new method. The method presented herein combines both environmental/operational data with performance data to detect product health, conduct diagnostics, determine the onset of critical degradation, and predict time to eventual failure.

The methods described in this invention can be used for health assessment and remaining-life prognostics for various products and systems including but not limited to avionics, consumer electronics, computers, machine-tools, information systems, energy products and systems, automotive systems, and other modes of transportation (e.g., trains, ships) medical equipment, telecommunication equipment, equipment used for oil, gas, and refineries, weapons systems, and civil infrastructure.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 includes illustrative plots of data reduction and load parameter extraction techniques applied to recorded data according to an embodiment of the invention.

FIG. 7A through 7E are plots of the resulting distribution of cyclic temperature ranges, means, ramp rates, dwell times, and dwell temperatures for the time temperature history of the first case study illustrated in FIG. 6, applying the logic algorithms of FIG. 5. Various correlations between the load parameters are shown in FIGS. 7F-7H.

DETAILED DESCRIPTION OF THE INVENTION

Figure 1:
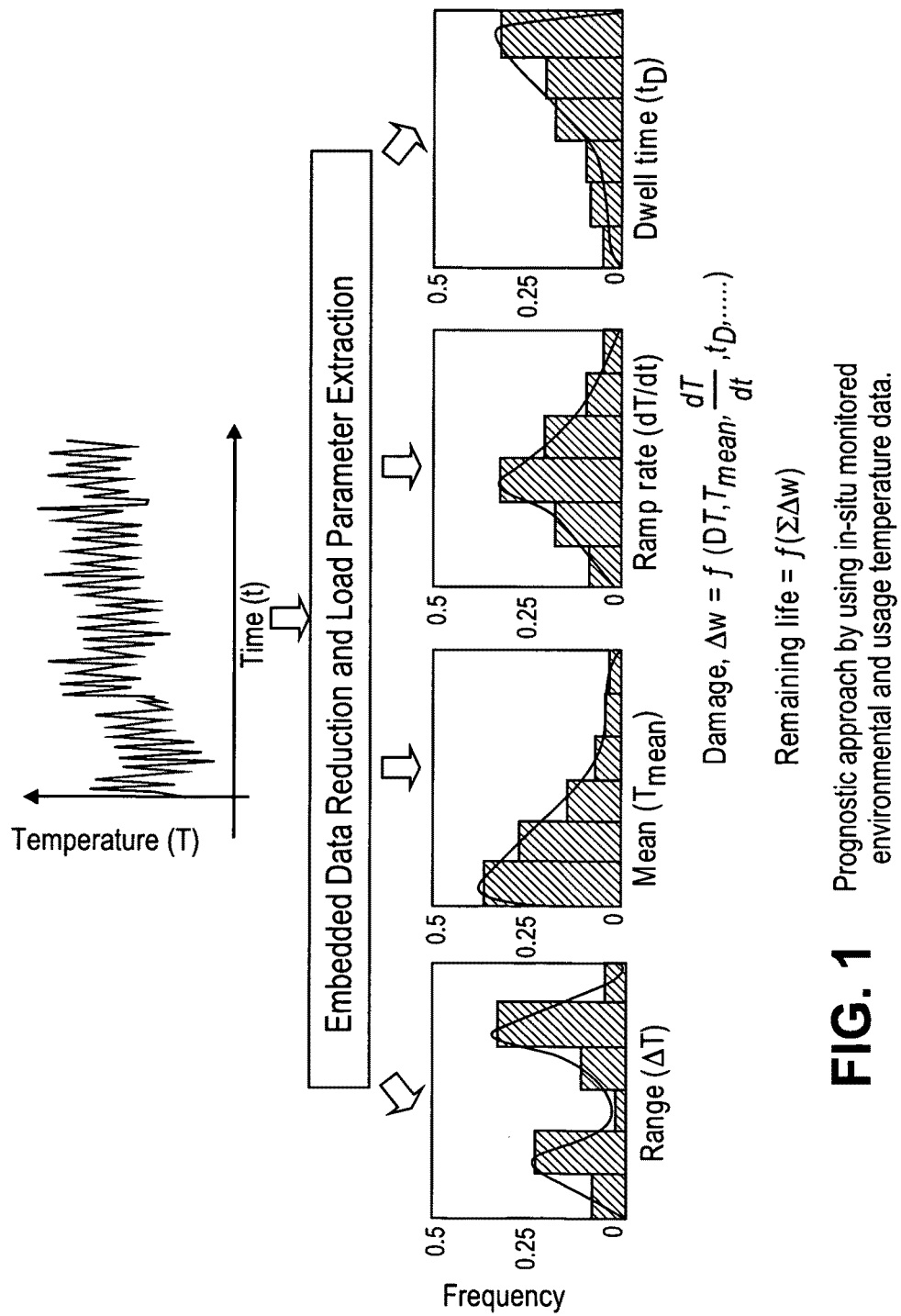
FIG. 1 depicts a prognostic approach which relies upon in-situ monitored environmental and usage data.
Figure 2:
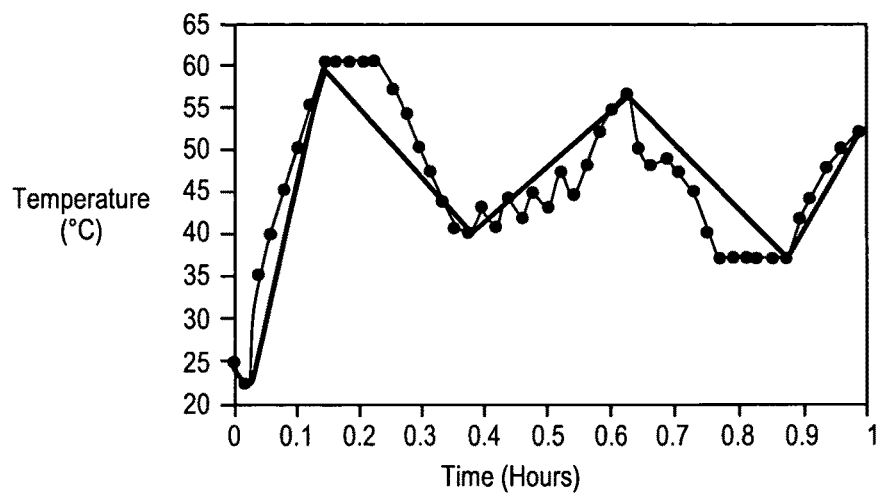
FIG. 2 is a chart illustrating how commonly used data reductions methods (dark solid line) can potentially eliminate dwell regions and hence damage models [using this data alone would lead to a failure to account for damage caused due to loads in the dwell regions].

As briefly discussed in the Summary of Invention, by the methods of this invention, data is obtained (usually from sensors) which measures exposure conditions and operating conditions to which a device or product is subject to over time. The exposure data is analyzed and in one embodiment used to predict failure according to a predetermined damage model. In another embodiment, the data is correlated to device or product performance, the combined data is then used to predict when such device or product is likely to fail. For example in a product being shipped, one might have a sensor package which may contain one or more types of instruments such as a clock, a temperature sensor, an accelerometer, and perhaps a humidity detector. Data is collected over time and recorded. The cycles are then analyzed.

In accord with a first embodiment, an algorithm has been developed to process measured load factors. In the discussion which follows, and by way of illustration, the environmental load factor of temperature is measured against time, and for a given time (t) versus temperature (T) signal, extracted are values for cyclic range $\Delta T$, cyclic mean temperatures ($T_{mean}$), ramp rate (dT/dt), dwell time $t_D$ and temperature of dwell. Typically these extractions are made electronically with the aid of a computer or microcomputer for carrying out the computations. Additionally, the correlation between, dwell times versus temperature of dwell, cyclic range versus mean temperatures, and cyclic range versus ramp rates are quantified in terms of rank order correlations. Again, such correlations are typically calculated electronically with the aid of a computer. These load parameters can then be used in conjunction with damage models to assess the damage at various failure sites due to different failure mechanisms for (by way of example) a given electronic assembly or product.

In the realm of electronic and semiconductor devices, the standards and documents for damage models include JEP 122C, Failure mechanisms and models for silicon semiconductor devices, JESD659-A, Failure-mechanism-driven reliability monitoring, JEP143A, Solid-state reliability assessment and qualification methodologies, JEP150, Stress-test-driven qualification of and failure mechanisms associated with assembled solid state surface-mount components, JESD94: Application specific qualification using knowledge based test methodology, JESD91A: Method for developing acceleration models for electronic component failure mechanisms, SEMATECH, #00053955A-XFR: Semiconductor device reliability failure models, and SEMATECH, #99083810A-XFR: Use condition based reliability evaluation of new semiconductor technologies. The entire process is implemented in a software program, which contains the details of the electronic board and component material properties and geometries, to enable rapid assessment.

It is to be noted that for each type of part that is manufactured a model (i.e. a damage model) can be developed. This may be undertaken by the part manufacturer, or the assembly facility or an OEM or a system or development organization. It may also be undertaken in the broadest sense by any customer. The unique model for each part or product will be determined by looking at such measurable factors as environmental loads, operational loads and performance parameters, and then correlating these factors to parts at failure. The models can include variables that measure its geometry, material properties, and methods of construction. Once these models are developed or obtained, then those factors most indicative to part failure can be monitored, data collected, and subject to various failure mode analysis as measured against the damage model to predict failure. As such, the development and determination of the predetermined damage model for a particular part or component does not constitute an element of this invention.

Figure 3A:
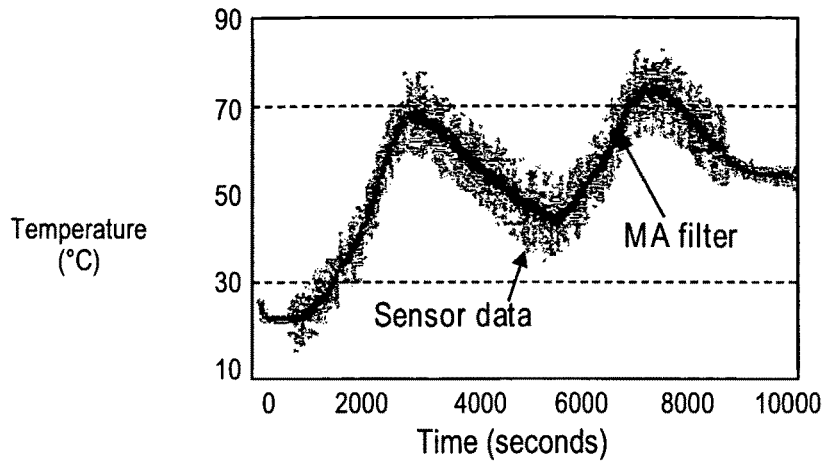
FIG. 3A is a plot of temperature vs. time data illustrating the utility of using a moving average filter to reduce noise.
Figure 3B:
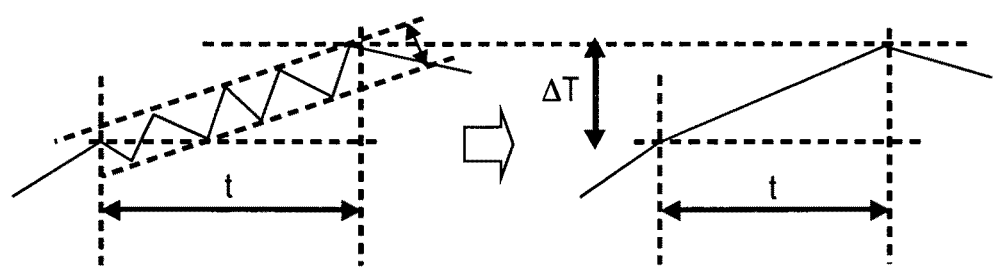
FIG. 3B depicts the step of accounting for the monotonically increasing (or decreasing) data and merging small ranges into the overall data stream.

The first step in the execution of the algorithm for the diagnostic and product health monitoring method of this invention begins by processing the irregular time-load data using a moving average filter to remove noise (FIG. 3a). Typically a filter with a smoothing factor of ten has been reported to provide adequate noise reduction for various signal types. In the next step small ranges are merged into overall increasing, decreasing, or dwell data streams (FIG. 3b). The threshold for selecting the small ranges is selected based on the significance of the range in the damage model. For example, if the damage is proportional to the nth (n>1) power of the range, then all ranges less than the nth root of the maximum range measured in the present time-temperature data are merged. If n=1, then all ranges that are less than 1/10th of maximum range are merged.

Figure 3C:
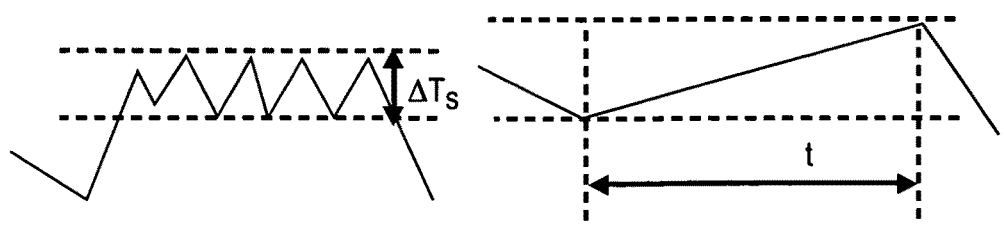
FIG. 3C illustrates the step of identifying dwell regions using range and ramp-rate.

In case of measured field data it can at times be challenging to identify dwell temperature regions. This is because dwell regions may appear as a series of small cycles with a constant or near constant mean (left portion of FIG. 3c), or it can also appear as a relatively large cycle with an extremely slow ramp rate (right portion of FIG. 3c). For example, if the range threshold is $\Delta T$ less than 5° C., then several consecutive cycles with $\Delta T<5°$ C. is considered dwell. However, a cycle with say, $\Delta T=10°$ C. but a slower ramp-rate is also considered as dwell. Based on these criteria, the algorithm scans the time-temperature data and identifies the dwell temperatures and dwell times.

In the next step, the correlation coefficients between dwell time and dwell temperatures is calculated and stored. The actual values of dwell time and dwell temperatures are then stored in a histogram with optimal bin-widths. The bin-data is used with kernel functions to estimate the probability density of the measured values. This method enables enormous on-board storage reduction and improves the ability of the sensor module to monitor for longer time durations.

Figure 3D:
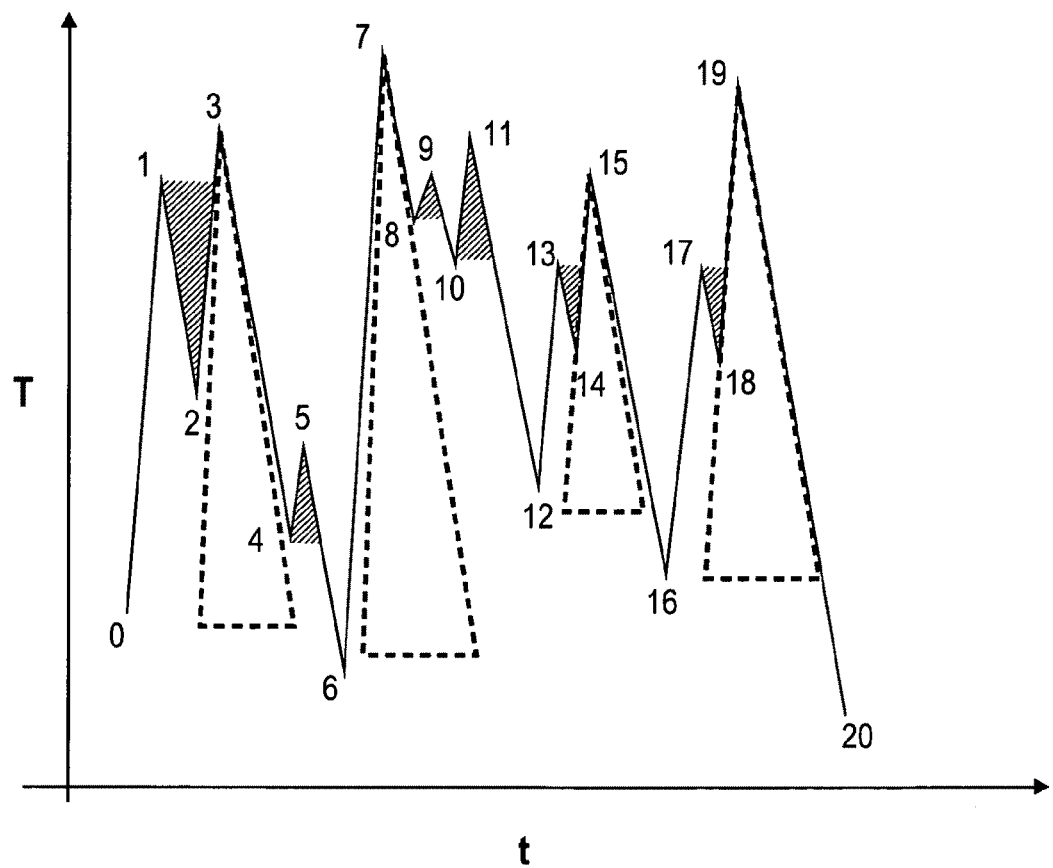
FIG. 3D shows the final step of scanning the load data to identify full and half cycles.

The time-temperature data is then scanned to identify full cycles. The geometric definitions of full and half cycle are well documented. The time-temperature data is scanned to identify if $\Delta T_i$ is a full cycle based on the condition $\Delta T_{i-1} > \Delta T_i \leq \Delta T_{i+1}$ (FIG. 3D). For each cycle the mean temperature and ramp-rate is recorded. The full cycle is then removed from the data stream and the residual time-temperature containing half cycle data is merged with the original time stamp being retained. The process is iterated till all full cycles are identified and electronically stored in an appending matrix. The remaining half cycles are then converted into full cycles. At the end of cycle counting the correlations between temperature range versus mean temperatures, and temperature range versus ramp rate are assessed and recorded (such as in an electronic memory). If the failure model being used does not include dwell time and ramp-rates, then these values can be ignored and only the cyclic ranges and means provided by the load parameter extraction method are then used for damage assessment. Ignoring the ramps and dwells results in further data reduction. However, one can archive the ramp-rates and dwell times histograms for future use if a damage model becomes available.

Figure 4:
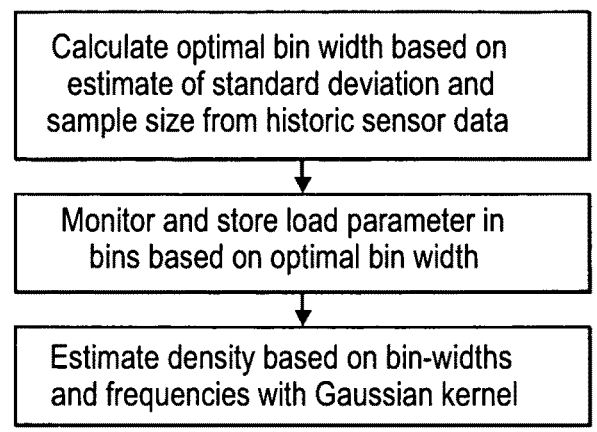
FIG. 4 is a flow chart depicting an approach according to an embodiment of the invention for binning and density estimation of monitored load parameters.

In the next, or third step, the extracted load parameters are stored in appropriate bins to achieve further data reduction. The binned data is downloaded to estimate the distributions of the load parameters for use in damage assessment, remaining life estimation, and the accumulation of the products use history. Since the accuracy of the damage assessment and remaining life prognostics depend on the accurate estimate of the probability density functions (pdf) of the loads derived from the binned data, it is essential to select the appropriate bin-width and number of bins a-priori. The procedure according to an embodiment of the invention for binning and density estimation is illustrated in FIG. 4.

The density function is a representation of the frequency distribution of the data in which the height of the bins represents the observed frequencies. The choice of bin-width primarily controls the representation of the actual data. Smaller bin-widths may present too much detail (undersmoothing) and larger bin-widths may present too little detail (oversmoothing) of the true distribution. Optimal bin widths are the bin-width values that minimize the mean-squared error between the true distribution of data and the estimate of the distribution. Hence density functions obtained from data grouped in bins of optimal bin-width will more accurately represent the true distribution of the underlying data. For a further discussion of optimal binning and density estimation for health management, see Vichare, N., Rodgers, P., Pecht., M., Methods for Binning and Density Estimation of Load Parameters for Prognostics and Health Management, International Journal of Performability Engineering, Vol. 2, No. 2, April 2006, pp. 149-161.

The load parameter values are then stored in a histogram with optimal bins as described previously. The entire procedure for load parameter extraction is shown in FIG. 5. The on-board memory of a computer being used to make these calculations is cleared by deleting the matrix containing the load parameters and only the histograms and correlation values are retained.

Figure 5A:
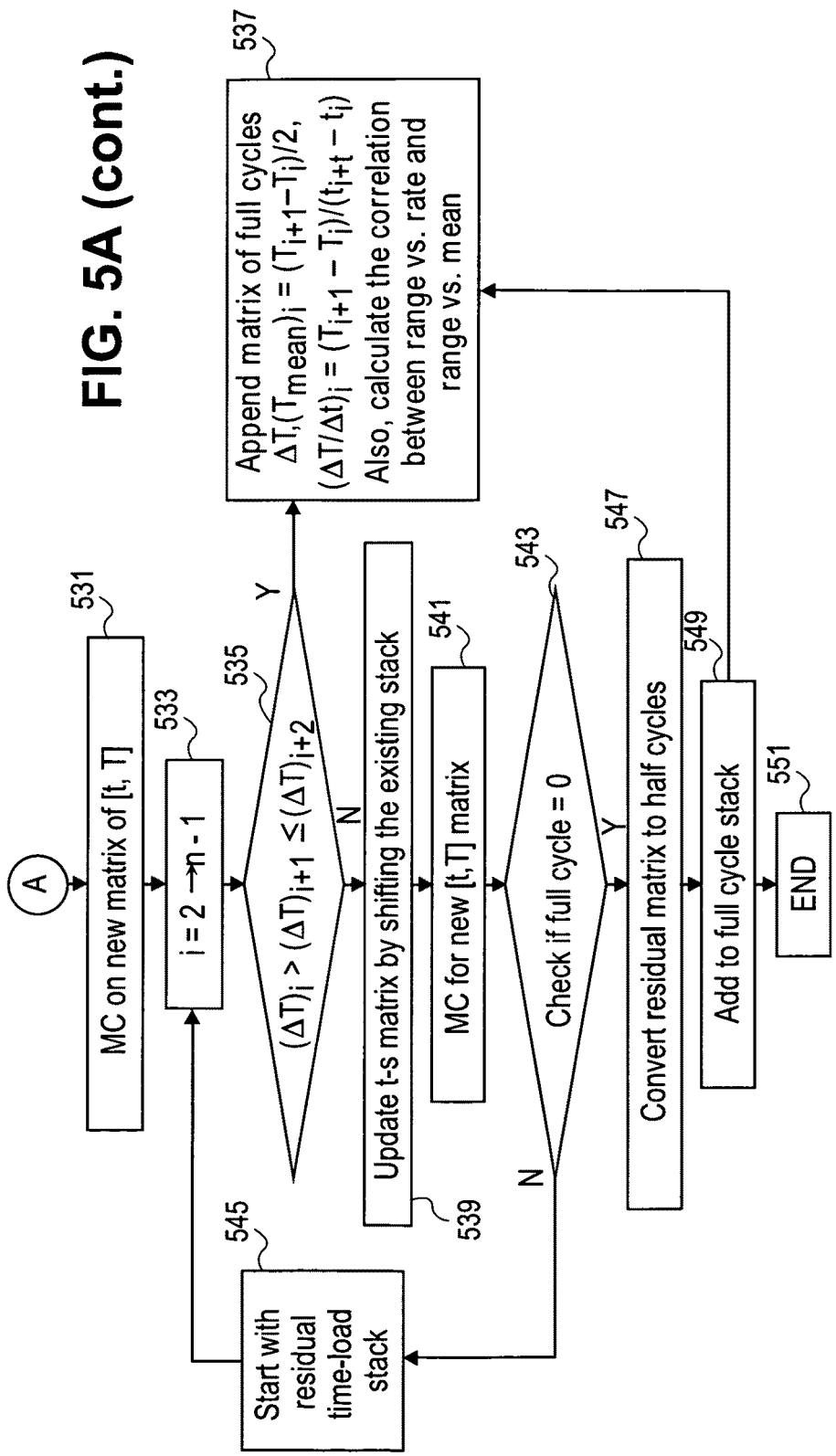
FIG. 5A is a logic flow chart for a program (which can be implemented in firmware, software, or a combination thereof) which can be used in connection with a load parameter extraction method according to an embodiment of the invention.
Figure 5B:
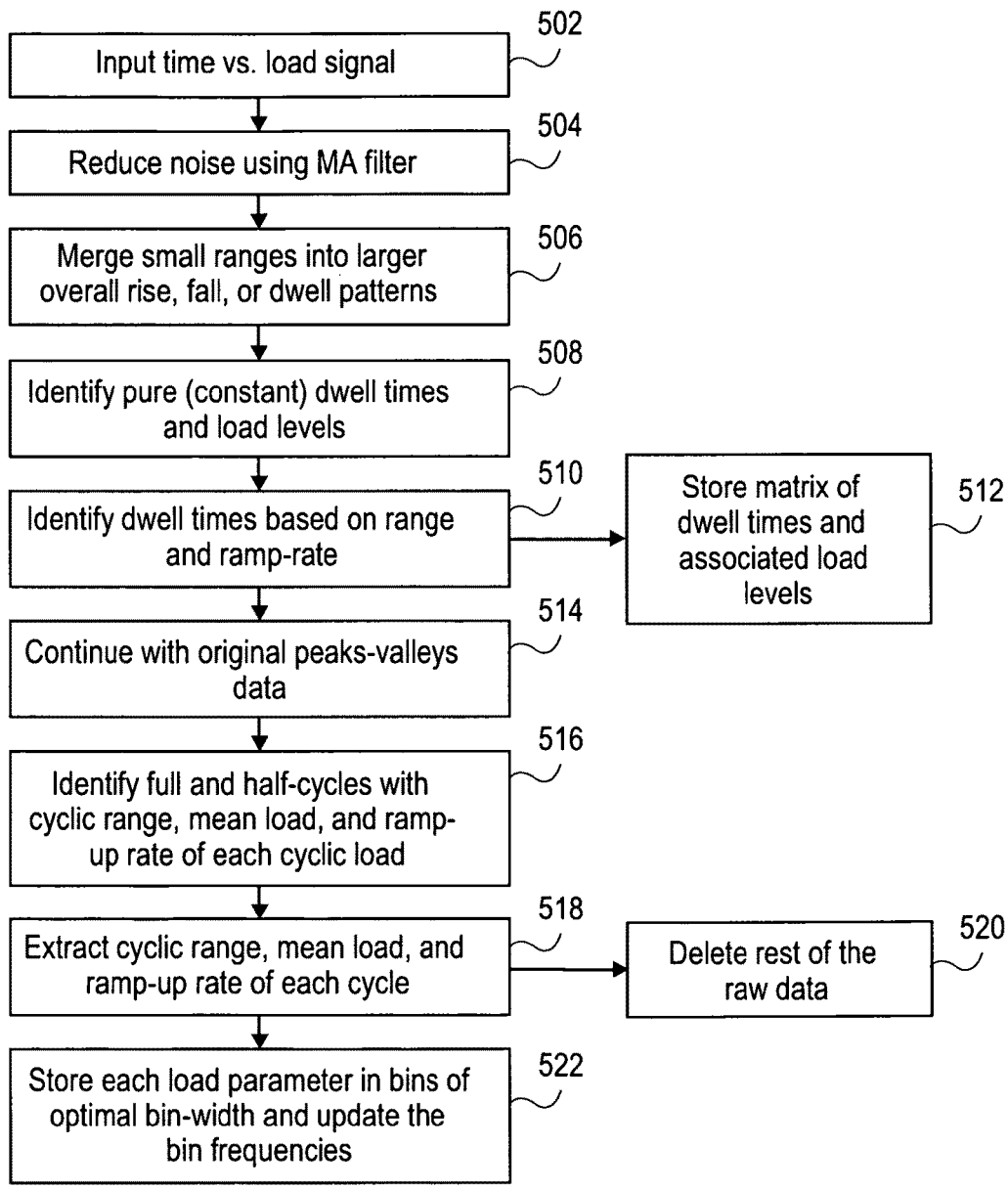
FIG. 5B is a high-level block diagram of the load parameter extraction method of FIG. 5A.

The load parameter extraction method is now described in detail with reference to both FIG. 5A and FIG. 5B, a high-level block diagram of the detailed algorithm of FIG. 5A. As shown by box 501 in FIGS. 5A and 502 in FIG. 5B, the input to the load parameter extraction process is a time-series load signal (e.g., time vs. temperature). The input signal can be obtained from single or multiple sensors. The measurement interval for the input signal can vary from milliseconds to minutes, or more, depending on the product, sub-system/component being measured, and operating conditions. For example, with a consumer electronics product, the temperatures from batteries could be measured every minute and temperatures on micro-controllers could be monitored every second. Again depending on operating conditions, the monitoring frequency can vary. The micro-controller temperature can be recorded every millisecond during heavy operation or start-up and every second under steady load or idle. The load parameter extraction algorithm is independent of the measurement frequency of the input signal.

The input signal is often irregular and noisy. The first step is to reduce the noise using a moving average filter as shown in box 503 and 504. The output of the moving average filter now creates a noise-reduced signal that contains small ranges. At this time a threshold value (e.g. Ts) is selected by the user.

Any range smaller than the threshold is merged into the overall increasing, decreasing, or dwell data streams. One can select a threshold value based on simulations using the physics-of-failure based damage models mentioned in paragraph [0040]. To accomplish this, a range of loads values are provided as inputs to the damage model. The sensitivity of the damage model output to the given loads is studied. A threshold can then be selected at a value below which the damage caused, as indicated by the damage model, is insignificant. Selecting thresholds using this method ensures that the error in damage calculation is minimized since only the insignificantly small damage values are ignored. However, this method may not provide the best solution in terms of data reduction. Hence, threshold selection can also be based on the trade-off between data reduction and the error induced in damage calculation. A detailed discussion of this trade-off method is discussed in the article by Vichare, N., Rodgers, P., Eveloy, V., Pecht, M., entitled Monitoring Environment and Usage of Electronic Products for Health Assessment and Product Design, Journal of Quality Technology and Quantitative Management, Vol. 4, No. 2, 2007, pp 79-94.

Box 505 to 515 shows the process of converting the input from the MA filter to a signal that contains purely increasing, decreasing, or dwell data streams. The output obtained in box 515 is used as input in the dwell extraction process.

In case of measured field data it can be challenging to identify dwell regions. This is because dwell regions may appear as a series of small cycles with a constant or near constant mean, or it can also appear as a relatively large cycle with an extremely slow ramp rate. At this stage a threshold ramp is selected by the user. The methods discussed in paragraph [0050] for selecting the threshold can be employed here too. Based on the threshold, the algorithm directs an electronic scan of the time-load data and identifies the dwell regions and dwell times (boxes 517 to 531). This is a first output from the algorithm, i.e., the matrix of dwell loads and the time of dwell (box 527, 512). A correlation between these two parameters is also calculated (box 512). The values of the dwell loads and dwell times are binned using optimal bin-width. The rest of the data on dwell can be disposed.

The remainder of the data set now contains only increasing and decreasing data streams. This data set is now scanned by the computer to identify full and half cycles. The geometric definitions of full and half cycle are well documented in ASTM standard E-1049 (1997). As shown in boxes 533 to 551, the time-load data is scanned to identify full cycles $\Delta T_i$ using condition $\Delta T_{i-1} > \Delta T_i \leq \Delta T_{i+1}$ (box 535). For each cycle the mean load and ramp-rate is recorded (537, 518). The full cycle is then removed from the data stream and the residual time-temperature containing half cycles is data is merged with original time stamp being retained (boxes 539-541). The process is iterated until all full cycles are identified and stored in the appending matrix. The remaining half cycles are then converted into full cycles (boxes 535-549). At the end of cycle counting, the correlations between load range versus mean loads, and load range versus ramp rate are assessed and recorded (537, 518). The load range, mean, and ramp-rate are binned using optimal bin-width (522). The rest of the data can then be deleted which results in even further data reduction.

First Case Study

The load parameter extraction method of this invention is first tested using simple data sets. Various time-temperature data series are generated to evaluate the ability of the algorithm to correctly identify dwell regions based on small cycles and ramp-rates. For the cycle counting part, the algorithm is primarily based on the proven and tested Rainflow cycle counting method, and hence additional rigorous testing was not required.

Figure 6:
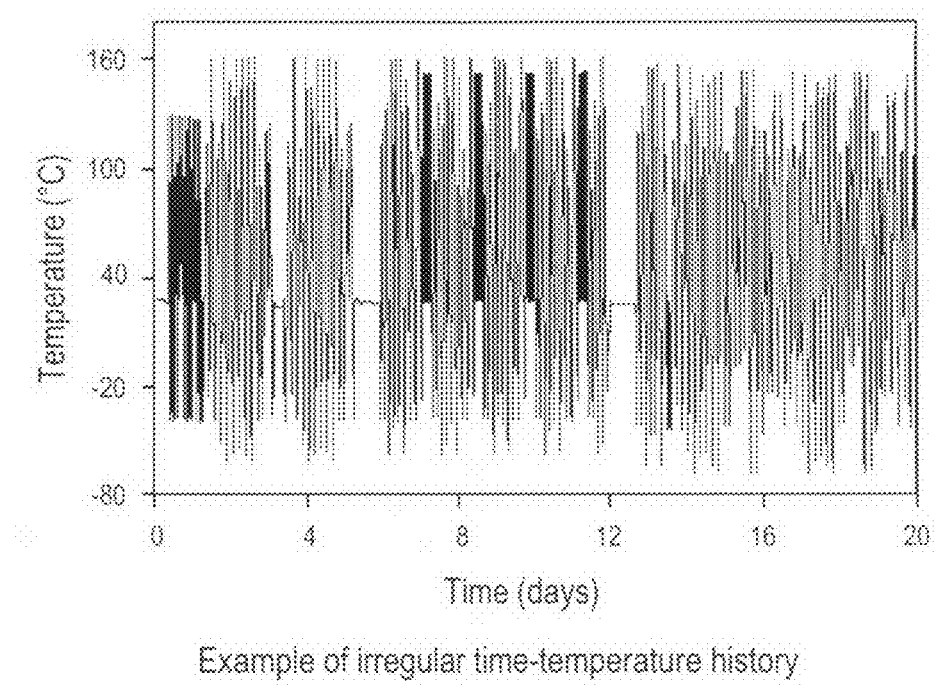
FIG. 6 is a plot of the irregular time-temperature history of the article of manufacture tested in a first case study.

The application of the method is then demonstrated for electronic prognostics by processing in-situ monitored temperature data. Herein, an electronic component, a commercially available QFP 256 test board, was exposed to irregular temperature cycles using a programmable oven to simulate field conditions. An irregular profile is generated produce temperature cycles with different ranges, means, ramp-rates, and dwell times. Temperature extremes ranged from −50° C. to 160° C. and dwell times were randomly selected as multiples of five between 0 to 30 minutes. Also long dwell times were recorded at room temperatures when the oven was shutdown to simulate non-operating conditions. A snapshot of 20 days of temperature exposure out of 110 days is shown in FIG. 6.

Figure 7B:
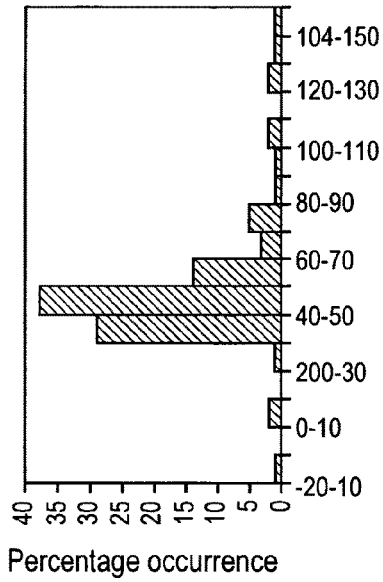
Figure 7D:
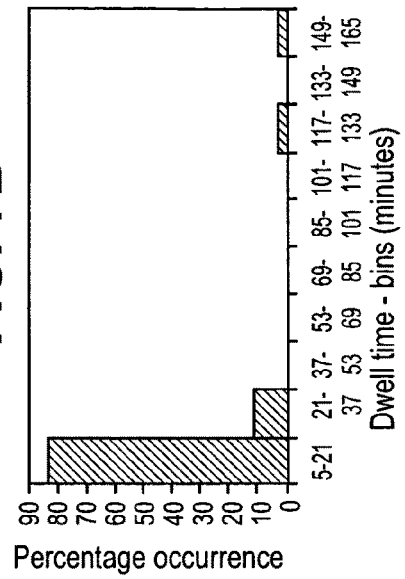
Figure 7A:
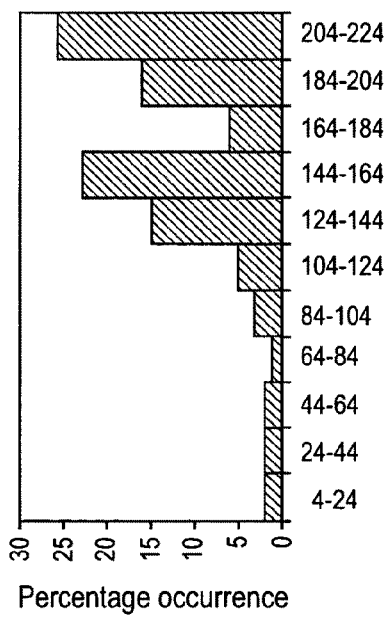
Figure 7C:
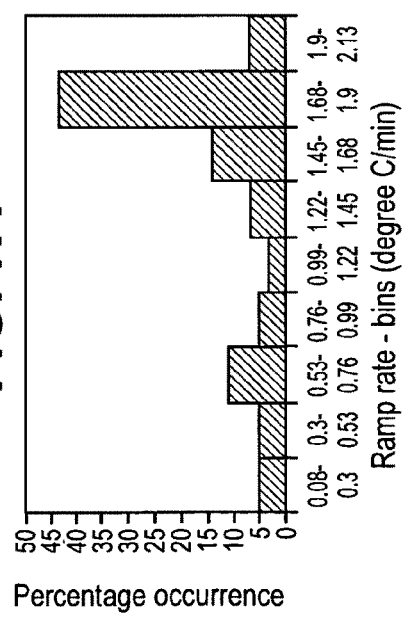

The time-temperature data was processed using the steps shown in FIG. 4 that were implemented in a visual basic for applications environment. The resulting distribution of cyclic temperature ranges, means, ramp rates, dwell times, and dwell temperatures is shown in FIGS. 7A-7E. The histogram of dwell times shows that the algorithm correctly identified the dwell regions that were programmed between 0 to 30 minutes (FIG. 7F). Also, the longer temperature dwell periods (>160 minutes) programmed to represent the non-operating periods were correctly identified.

The correlation between the load parameters is shown in FIGS. 7F-7H. More specifically, FIG. 7F shows that the occurrence of the longer temperature dwell corresponds to temperatures in the range of 25-27° C. The correlations (ρ) of −0.85 shows an inverse correlation, i.e., a low value from dwell time distribution corresponds to high value in dwell temperature distribution and vice versa.

Utilizing the load parameter extraction techniques as described above, one may use such extracted data to predict failures as discussed in the next section. However, the load extraction methodology of this first section is independent from, and may or may not be used in connection with the trending failure analysis hereinafter described.

Features for Trending Failure Precursor

Figure 10:
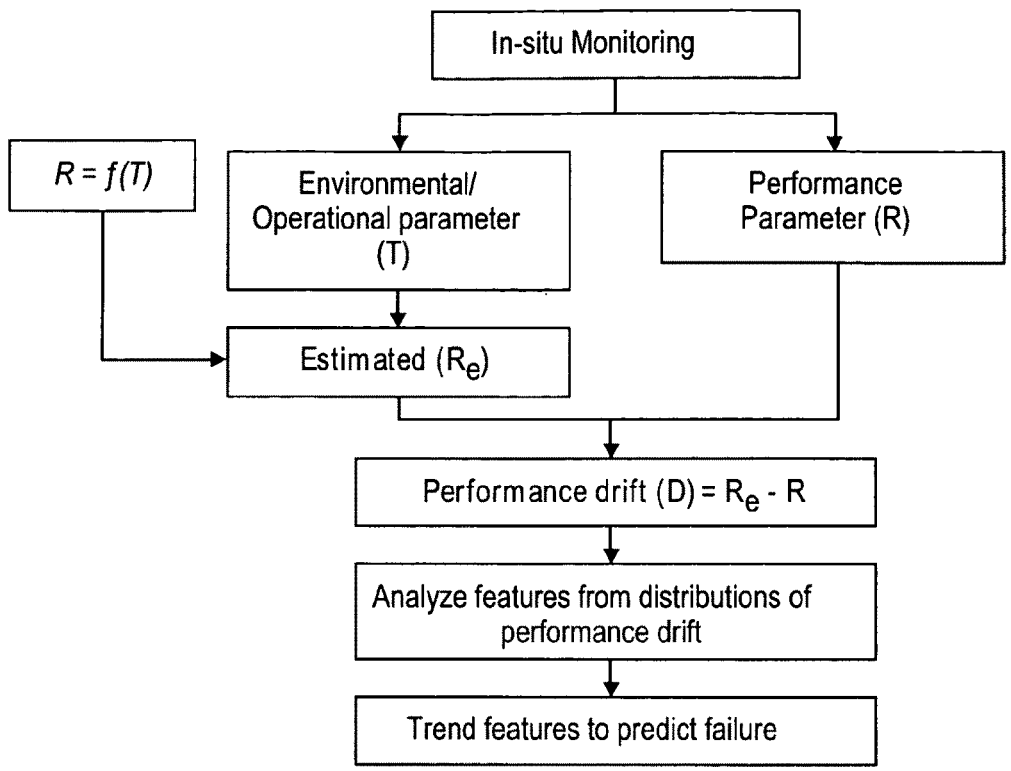
FIG. 10 is a flow chart of the logic algorithm used in the second case study to predict failure, based on failure precursor identification and tracking of changes in drift values.

In this section a method for trending statistical features obtained from analyzing the performance and operational/environmental data is presented. The methodology is explained for a simple case of two variables. Let T be the operational or environmental parameter that the product or system is exposed to in field. Let R be the performance parameter of interest. There are two important issues: (1) the identification of the degradation trend for R as early as possible in the field and (2) the effect of variations of T on R. If a consistent degradation trend can be established, this trend can be used as a precursor to failure, i.e, it can provide an advance warning of failure. The approach explained here can be used to identify the onset of degradation and trend the statistical features to provide advance warning of failure as shown in FIG. 10, and later illustrated in FIG. 21.

The core of the approach is the mathematical model that explains the relationship between T and R, in the form, R=F (T). The model that explains this relationship can be based on data, physical relationships between the variables, or a combination of the two. To build a model, data is required from controlled experiments and/or from fielded systems obtained by monitoring R and T. This data is then used with linear or non-linear models to identify the set of equations that can best fit the data, Techniques such as regression can be used to identify the best fitting equation.

Once the relationship between the parameters is established one can estimate the performance, say $R_e$, for a given value (or values) of environmental/operation parameter T. The difference between R and Re is the drift. Drift indicates a deviation from the expected normal condition. If the system is healthy then drift values will follow a normal distribution with mean zero. The drift values (Re-R or R-Re) can be positive or negative. In the further explanation of approach followed herein, and in the subsequent second case study we determine drift values using (Re-R). The values of drift in time domain also produce a noisy signal and cannot be always directly used for identifying a degrading trend. Hence the values of drift are averaged over windows of a specific time period (minutes or hours—depending on the variability of data). Using the time averaged drift data, various statistical features of the drift data can be considered for identifying the best (most reliable) statistical approach to be used as a prognostic indicator. The list of features that were investigated is shown in Table 1. As noted in the first row of Table 1, drift can be directly used in certain cases of less noisy data.

TABLE 1

Statistical Features Investigated

Figure 16:
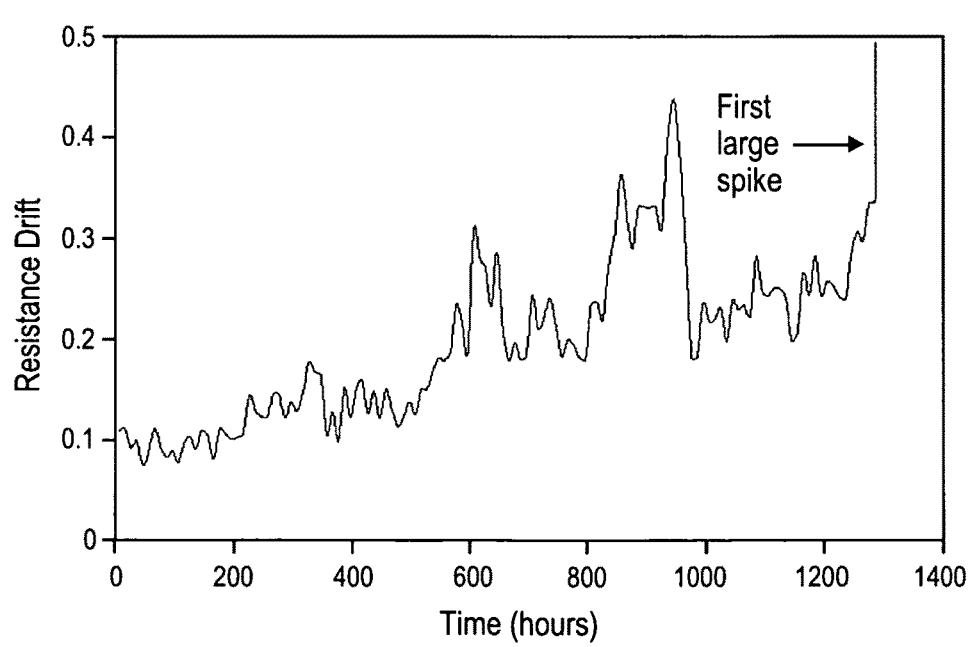
Figure 17:
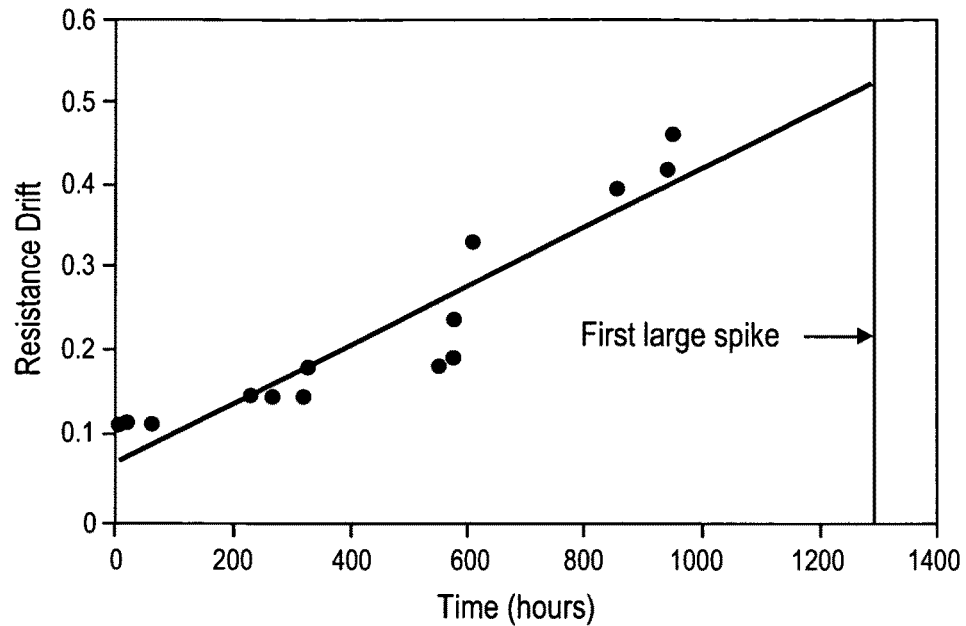

| Statistical Feature | Formula |
| --- | --- |
| Drift (D) | $D = R_e(T) - R(T)$ |
| Mean drift values (FIG. 13) | $\frac{1}{n}\sum D_i$ |
| Mean peaks (FIG. 14, 21) | $[t, \overline{D}^*], \overline{D}^* = \text{Max}(\overline{D}_i)$ |
| Standard deviation of drift (FIG. 15) | $\sqrt{\frac{1}{N}(D_i - \overline{D})^2}$ |
| 95% cumulative distribution values (FIG. 16) | $F_{0.95}(D)$ |
| 95% cumulative peaks (FIG 17, 21) | $[F_{0.95}]_i^*, (F_{0.95})^*_i = \text{Max}(F_{0.95})_i$ |
| Skewness (FIG. 18) | $\left[\sum_{i=1}^{n}(D - \overline{D})^3/n\right] / \left[\sum_{i=1}^{n}(D - \overline{D})^2/n\right]^{3/2}$ |
| Skewness peaks (FIG. 20) | $[t, S^*_i], S^*_i = \text{Max}(S_i)$ |
| Kurtosis (FIG. 19) | $\left[\sum_{i=1}^{n}(D - \overline{D})^4/n\right] / \left[\sum_{i=1}^{n}(D - \overline{D})^2/n\right]^{2}$ |
| Kurtosis peak | $[t, K^*], K^* = \text{Max}(K_i)$ |
| Third quartile | $75^{th}$ Percentile |

The comparison of changes in the selected statistical features evaluated vs. time will provide indication of degradation of the performance for parameter R (precursor to failure). Depending on the failure criteria for R, the best prognostic indicating feature should be selected. The selected feature should be sensitive to small changes in R over the expected lifetimes of the product. Another characteristic of the feature is that it needs to be monotonic (either increasing or decreasing) and thus easy to trend and predict. Failure can be defined as the intersection of the feature trend line with the failure threshold. The failure threshold can be based on an un-acceptable level of performance. System performance may be deemed un-acceptable if it exceeds the manufacturer's specification. It can also be based on operational performance levels that are unacceptable to the customer/end user. The approach is implemented in the second case study below.

Second Case Study

In this section a method for trending statistical features by analyzing the performance and usage data is presented using a case-study. The failure mode being investigated in this case-study is solder joint cracking, which can introduce the complete fracture through the cross-section of the solder joint with the solder joint parts having none or partial adhesion to each other. The failure mechanism is creep and stress relaxation enhanced thermal fatigue due to temperature cycling. A failed solder joint is normally surrounded by solder joints that have not yet failed and therefore the solder joint fracture surfaces make compressively loaded contact. During thermal changes shear is the primary force of stress on the solder joints. As a result, the rough fractured surfaces of the failed solder joints slide relative to one another producing characteristic short duration electrical transients. There are several methods to detect solder joint failures, including destructive testing to visually inspect cracks in the solder joints at periodic intervals, periodically measuring the electrical resistance of solder joints and define the failures based on the increase in original resistance, and continually monitoring electrical resistance of solder joints to detect electrical discontinuities as failures.

Here, the same QFP 256 test board used in the first case study, was used in this case study, the board having 6 different components and two components of each type, making for a total of 12 components on the board. All components have a daisy chain for monitoring resistance continuity. A daisy chain is a conductive path that connects several interconnections of a component. In this experiment a failure of any daisy chain indicates the failure of the component.

Thus in this experiment, the resistance of the daisy chains indicate the performance of the component. The daisy chains have a base resistance before start of the experiment. The daisy chain of the BGAs and QFPs extended onto the pads on the printed circuit board. Wires were soldered onto the pad and connected to a data logger to take measurements of resistance every ten seconds. The base resistance of the daisy chain was measured and recorded prior to thermal cycling exposure. The data logger was operated in constant current mode at a source current of 1 mA, which passes through the daisy chains and reports the resistance of the path.

Figure 8:
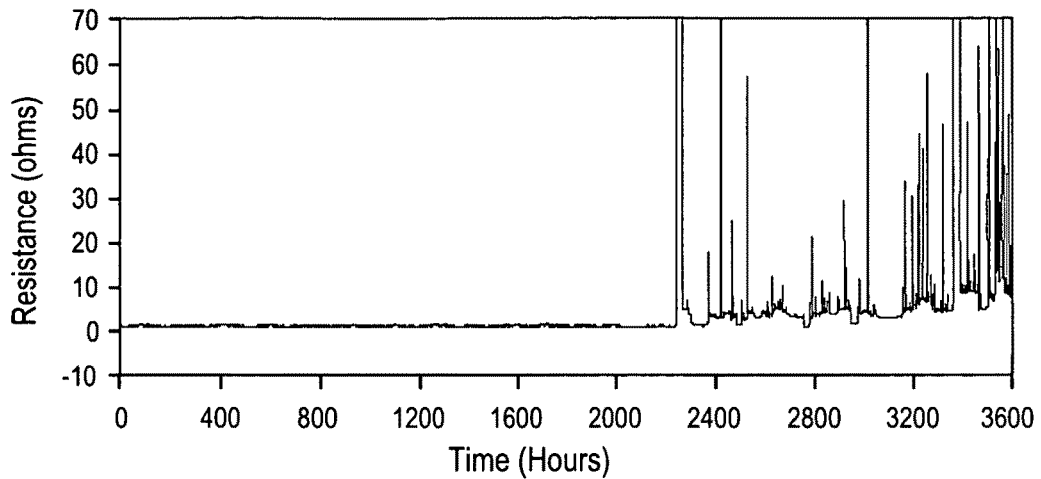
FIG. 8 is a plot of resistance data in ohms vs. time in hours of testing for the solder failure study discussed in connection with the second case study.

The plot of resistance versus days in testing is shown in FIG. 8. As the component approaches failure, the short duration electrical spikes are observed in the resistance values. After the first spike the subsequent spikes occur within a short duration of time and ultimately the solder joint shows a complete open (infinite resistance). It is evident from the FIG. 8 that just by monitoring the resistance it is impossible to provide any indication of degradation prior to the occurrence of the first spike. The question to be addressed is whether or not one can identify and estimate a degradation trend even before the occurrence of the first spike.

Figure 9:
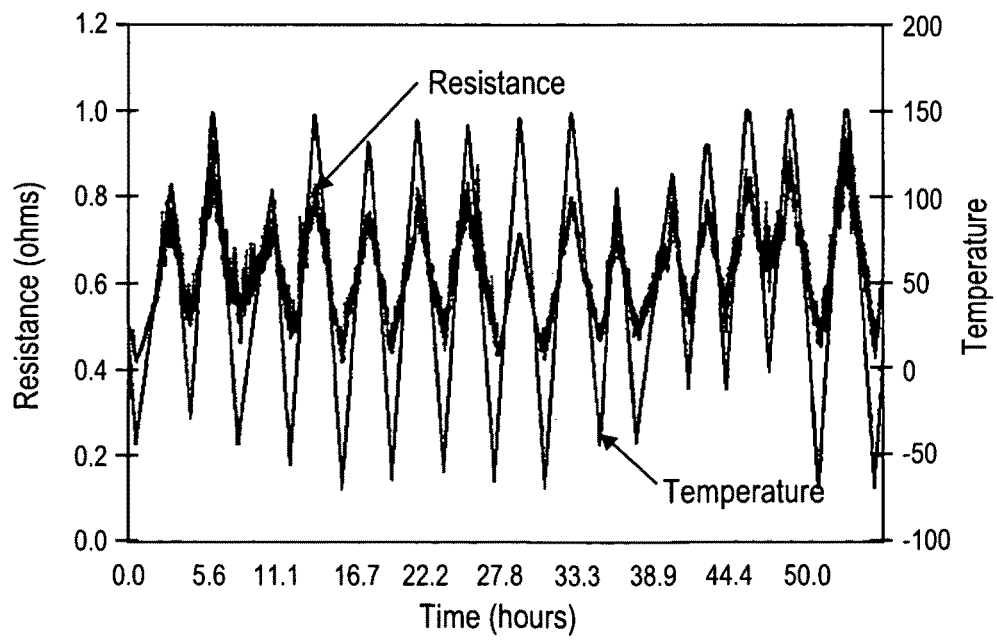
FIG. 9 is a plot of resistance and temperature of an electronic circuit board solder joint, the subject of the second case study, vs. time.

Additionally, the challenge to identify a degradation trend is further complicated due to the constant change in resistance values during thermal cycling. The resistance increases with increase in temperature and returns back to normal as shown in FIG. 9. This is a typical representation for a BGA component. However, the change in the temperature-resistance is dependent on the component, base resistance, temperature cycle, and also the damage accumulation of the component. For example, the change in resistance for a temperature cycle with ΔT of 100° C. is higher after 1000 cycles as compared to what is was at the start of the experiment. With continued thermal cycling the daisy chain resistance will gradually increase to indicate failure (crack growth leading to open connection), as shown in FIG. 8. The resistance will increase with initial spikes and eventually lead to complete open with infinite resistance.

Based on the above discussion there are two important issues: (1) the identification of resistance degradation trend before the occurrence of first spike and (2) the effect of temperature variations on resistance. The logic of the algorithmic approach used to resolve both issues and enable the identification of the onset of degradation is shown in FIG. 10.

The core of the approach is the relationship between temperature and resistance R=F(T), which is developed using in-situ monitored temperature and resistance data at the beginning of the experiment. This is equivalent to establishing a base-line performance. Since new components are usually in pristine condition, using this relationship, the resistance can be predicted as a function of temperature. Thus as the testing continues, the actual resistance R(T) is measured and recorded for the component. Also, based on the temperature-resistance (TR) relationship, a value of resistance is estimated Re (T). The actual resistance value is then subtracted from the estimated value in time domain, to provide a resistance drift (D).

The resistance drift indicates a deviation from the expected normal condition. However, the values of drift in time domain also produce a noisy signal and cannot be directly used for identifying a degrading trend. Hence the values of drift are analyzed over windows of ten hours. Using these values one can track the shift in the distribution of drift values. Also the ten hour window covers the longest temperature cycle that can be observed in the experiment. Using the ten hour resistance drift data, various features were analyzed to identify the best (reliable) feature that can be used as a prognostic indicator. Failure criteria were set to 50% increase in the mean of the drift distribution. The 50% increase also corresponds to the first large spike that was measured during resistance monitoring. Since a large spike in resistance could have a potential of disrupting the operation of a circuit board, it is considered as failure in this case study.

Temperature-Resistance Model

A second order polynomial was fitted to predict the change in resistance with temperature. The coefficients $\alpha 1$, $\alpha 2$, and $\alpha 3$ were calculated based on the first 3600 data points, with the corresponding 95% confidence intervals.

$$R = f(T) = \alpha_1 T^2 + \alpha_2 T + \alpha_3$$

Figure 11:
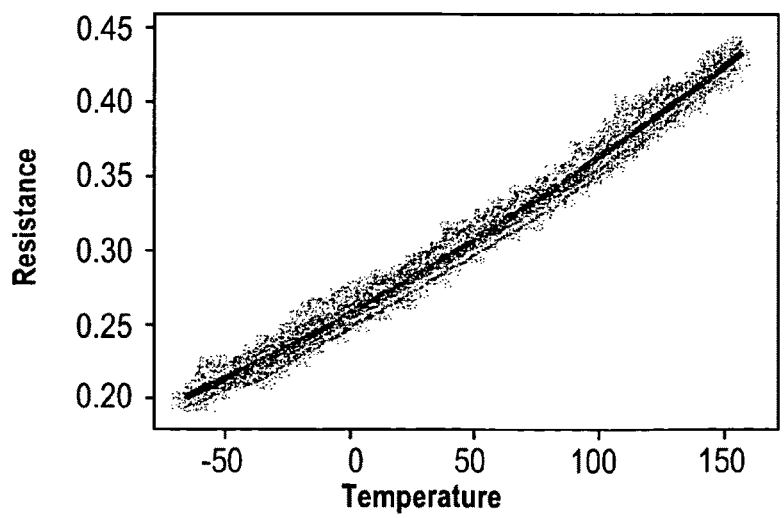
FIG. 11 is a plot of a second order polynomial regression fit between temperature and resistance for the solder joint of the second case study.
Figure 12:
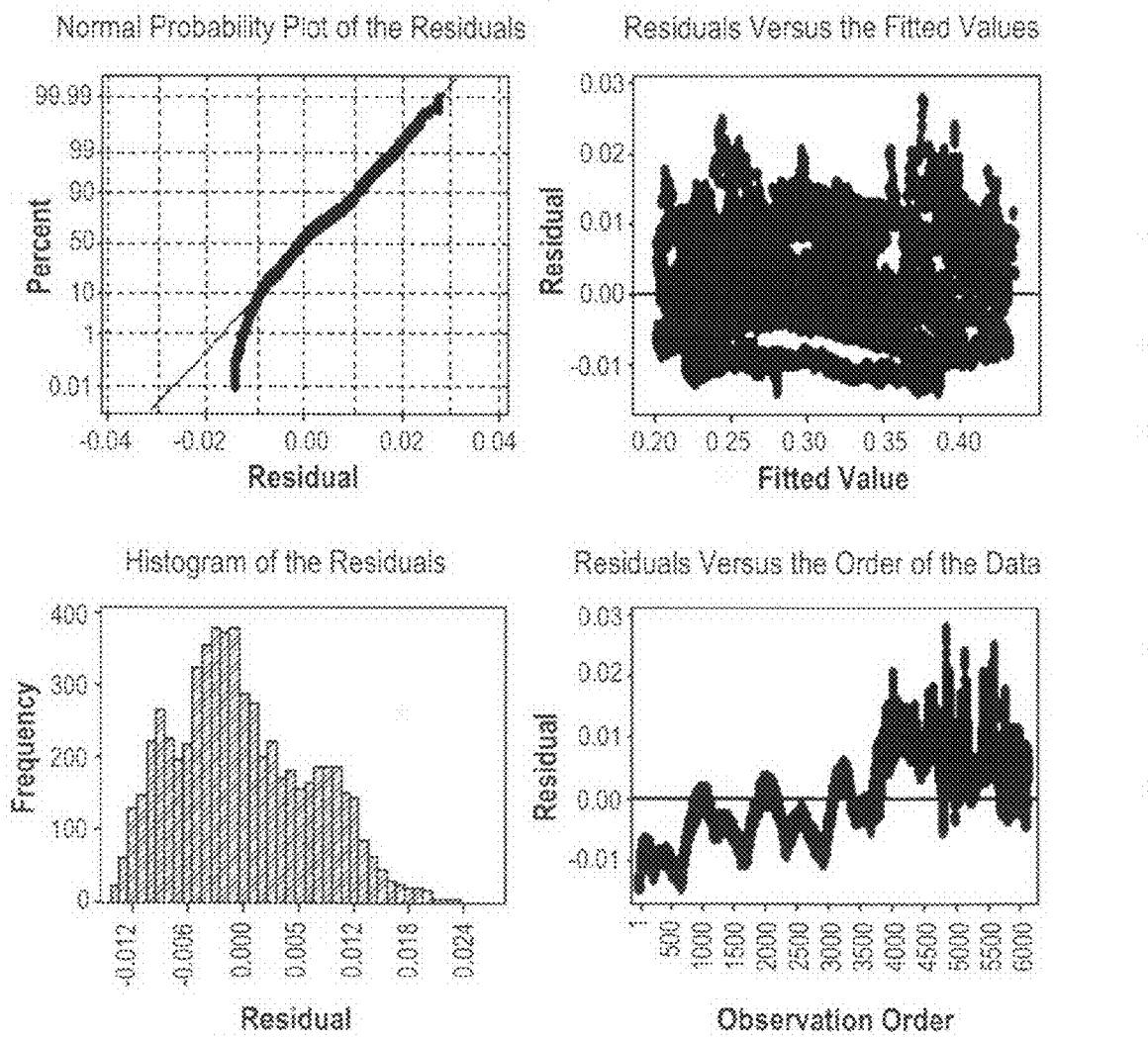
FIG. 12 is a plot of the residuals of the regression model. The distribution of residuals indicates that the polynomial model is a good fit to the data.

The fit for the QFP 256 component is shown in FIG. 11. The details of the fit are shown in FIG. 12. The value of the regression coefficients $\alpha 1$, $\alpha 2$, and $\alpha 3$ were calculated along with the corresponding 95% confidence values. The R-squared value for the fit is 98.9%. As observed from FIG. 12, the residual values follow a normal distribution with a mean zero. The residual values are evenly distributed around zero. Also, the scatter plot of fitted versus the residuals shows a uniform distribution with mean residual values around zero. The fitted values have a large spread from 0.2 to 0.45 ohms. Overall both FIG. 11 and FIG. 12 indicate that the model fits the data reasonably accurately.

Features Investigated

The values of resistance drift and the features of the drift distributions over a ten hour period were monitored and analyzed to identify which features could be consistently used as a precursor to failure. The list of all feature investigated is shown in Table 1. Over a period of ten hours the data was collected and the features listed in table 1 were calculated. The feature values were plotted on a time scale to identify if there is any observable trend. This procedure was conducted using data for all the components on the board, save one. The objective was to find: (1) a feature(s) that could be most reliable used for prognostics. Here the word reliable is used to indicate a degree of confidence, and (2) feature(s) that provided degradation trend across all components being investigated.

Results

Figure 13:
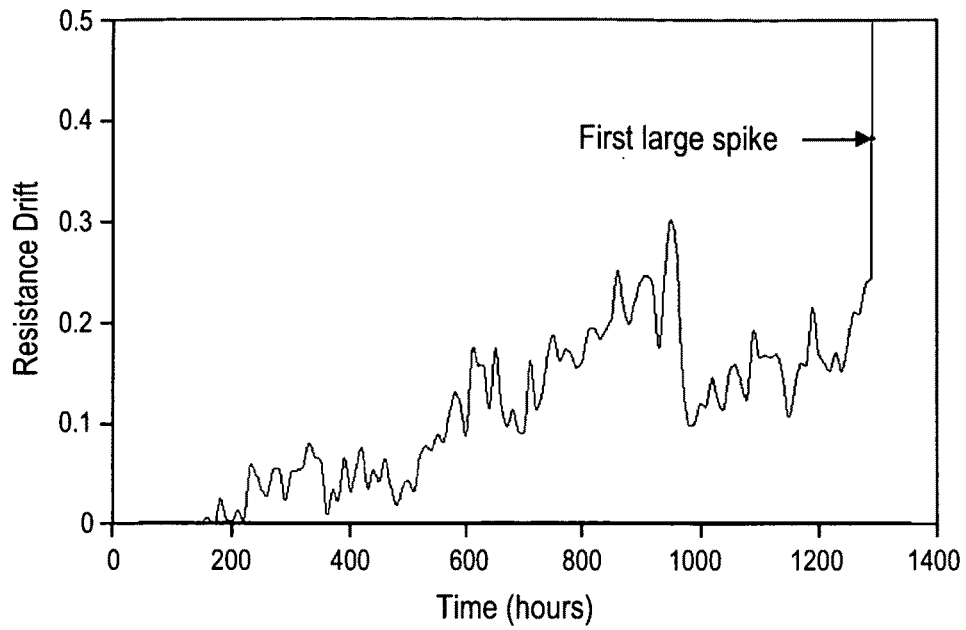
FIGS. 13 through 20 are plots of the results of the various statistical feature analysis applied to the performance drift values calculated using the experimental data and the polynomial model of FIG. 6. The plots illustrate the trending of statistical features obtained from the performance drift data to assess which statistical feature is the best predictor of failure.

Using the procedure in the previous section the results for QFP 256 are shown in FIG. 13 to FIG. 20. The following observations could be made about trending the different features. The values of resistance drift by itself were too noisy for trending and would lead to false alarms. The mean values of resistance drift distribution over a ten hour period were found to provide a good indication of degradation. As seen in FIG. 13, for the component QFP 256, the mean drift values are close to zero or very low for the first 200 hours. This indicates that the data fits to the regression model and there is no deviation from the baseline performance.

Figure 14:
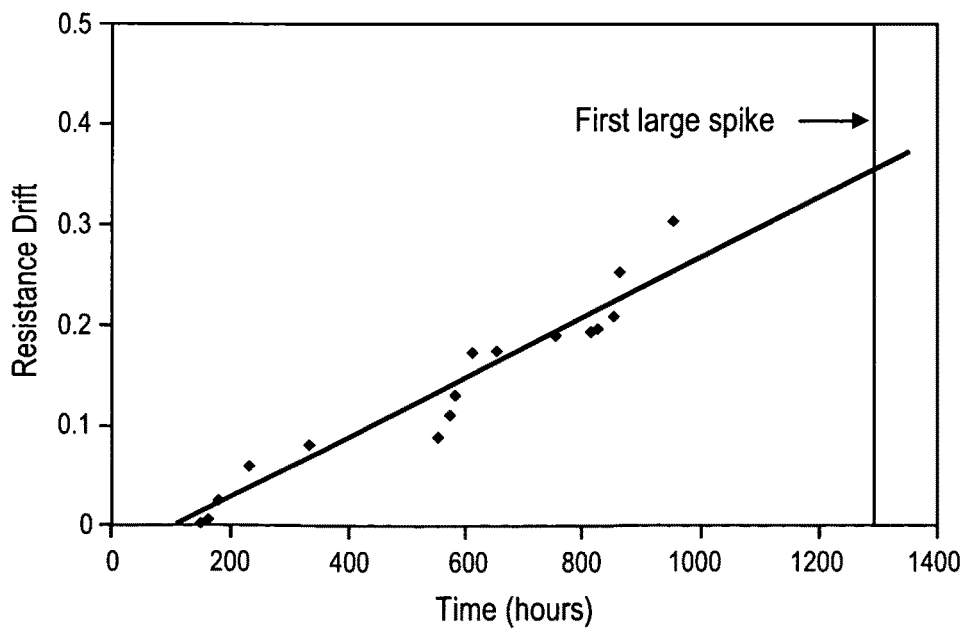

After 200 hour to 500 hours, the value of mean drift fluctuates between zero to 0.7. However, after 500 hours a steep rise is observed, with a clear increasing trend. This would indicate the onset of fault and possible progression to failure. The mean drift value was found to be the most consistent feature across all components with similar trend. FIG. 14 trends only the peak values of the mean drift. This is a better feature as there is no up or down trend (as observed with mean drifts and also few other features). The peaks are always increasing and hence the indication of degradation is clear.

Figure 15:
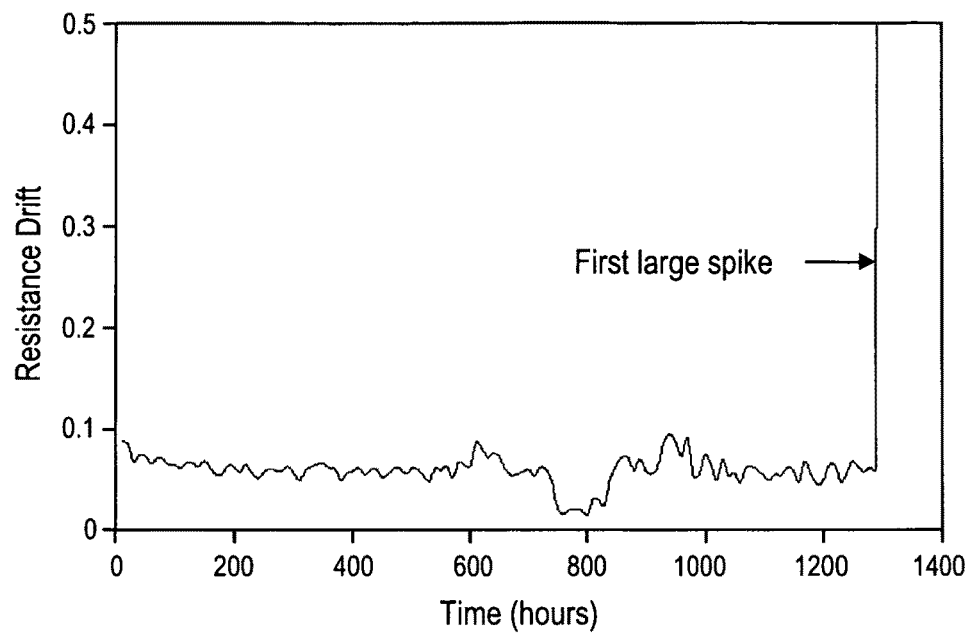
Figure 18:
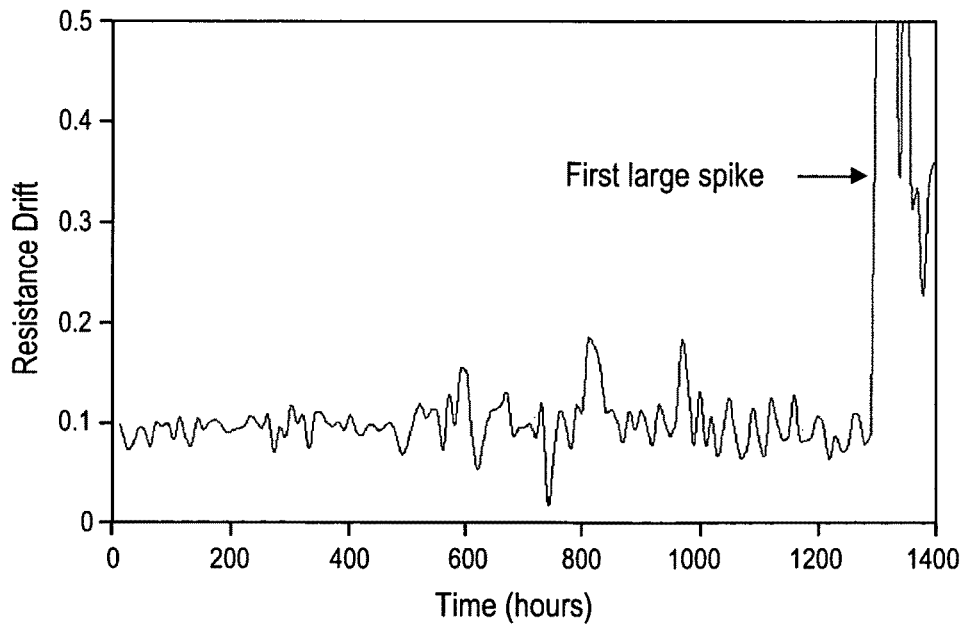
Figure 19:
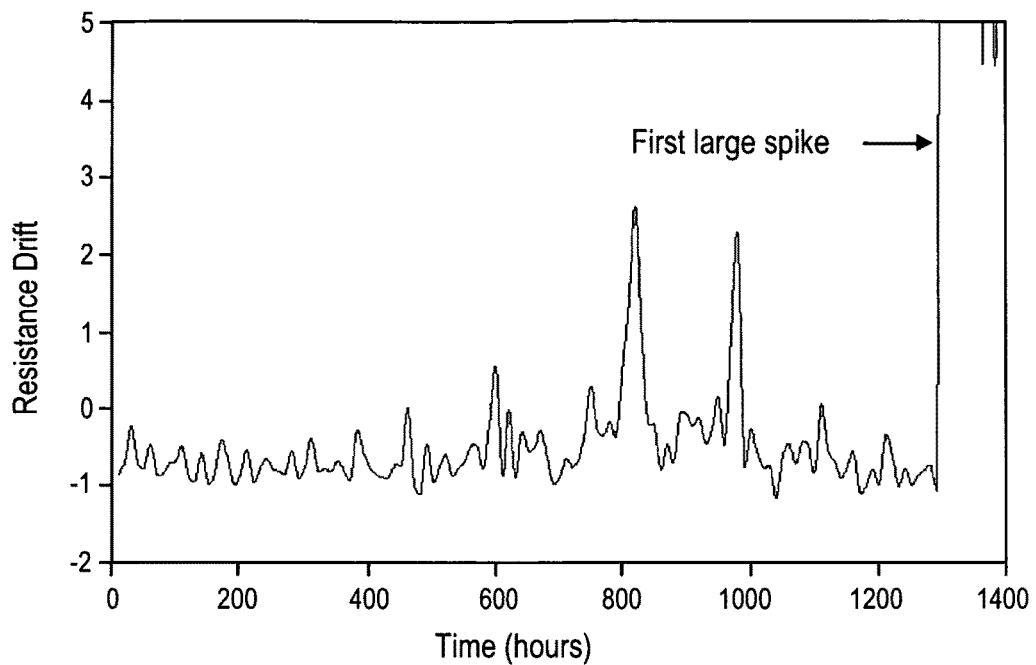
Figure 20:
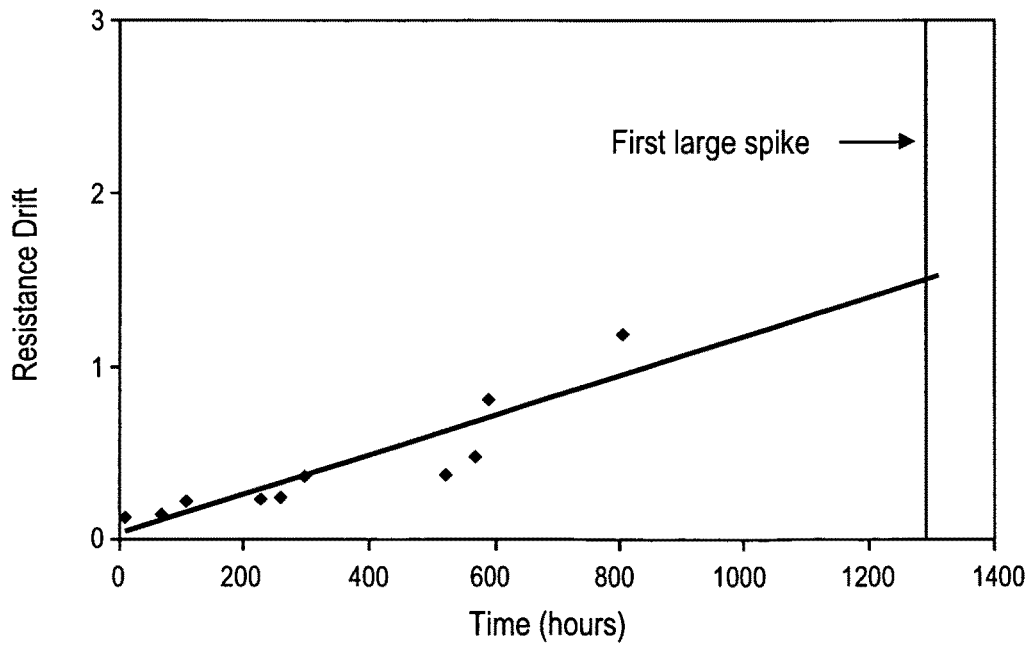

FIGS. 15, 18, and 19 show the standard deviation, skewness, and kurtosis values of the resistance drift. There is no change in the standard deviation values of the drift as the component approaches failure. One would expect that the standard deviation would increase with the mean (FIG. 15), but it was not observed from the data. Skewness and kurtosis were considered to describe the drift distributions more accurately. High positive skewness values would indicate that the drift distribution is getting skewed to the right, indicating more numbers of large positive drift values. However, for this component skewness values were not found to be a good indicator of degradation. Though, the peak skewness values (FIG. 20) show a consistent increasing trend, it is difficult to use this trend directly, especially since the component failure is not defined in terms of skewness.

The 95 percent cumulative distribution values of the resistance drift were found to be a good indicator of onset and progression of degradation. The progression of 95% cumulative values is similar to that observed for the mean values. The data (FIG. 16) is characterized with low or no degradation till 200 hours followed by slow increase till 500 hours, and the final rise to eventual failure. Similar to mean peaks, the 95% cumulative peak values was found to be a good indicator for degradation indication. This is primarily because the peaks only capture the increasing values of the curve and hence it is easier to interpret. When similar exercise was performed with data for all components on the board, the mean drift, mean peaks, 95% cumulative and cumulative peaks were found to be more robust features for prognostics.

Figure 21:
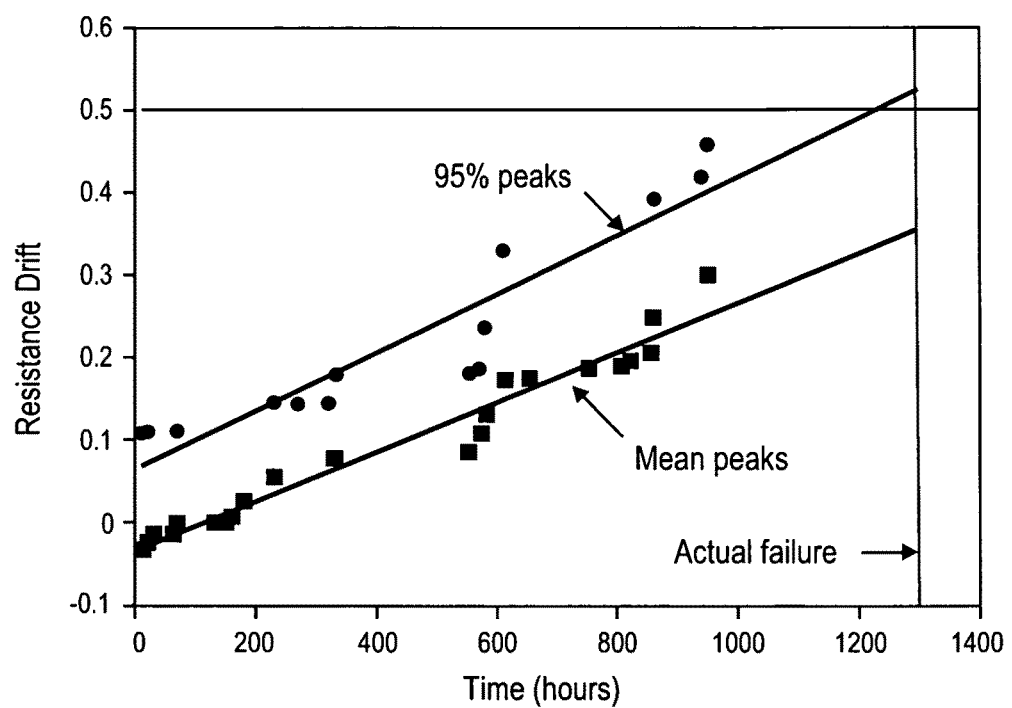
FIG. 21 is a plot comparing the failure prediction of a part calculating the values for both 95% peaks of FIG. 17 with the mean peak values of FIG. 14.

The mean peaks and 95% cumulative distribution peaks were fitted using linear regression to predict the failure (FIG. 21). The prediction obtained after 950 hours using mean values of the drift distribution was 1780 hours. The prediction obtained using 95% cumulative distribution values was 1210 hours. The actual measured failure was at 1300 hours. The actual failure could be enveloped by trending these two features.

Conclusions

A novel method has been developed for extracting cyclic range, mean, ramp rates, dwell times and their correlations, from irregular time-temperature history. The application of this method for electronic prognostics and health management was demonstrated. The method for load parameter extraction combined with storage of load parameters in bins resulted in 99.03% storage reduction per day, without compromising dwells regions. Thus embedding this algorithm with the sensor module can significantly enhance the ability of the module to monitor for longer durations without running out of memory. The method can also be used for processing different time-load signals such as strain, acceleration, and humidity.

Also, a novel approach was developed for predicting failure using in-situ performance measurements. The deviation of performance from established baseline was investigated using different features. The mean and the 95% cumulative values of the distribution were identified as the most robust features for indicating degradation. For prognostics, the 95% cumulative peak trend always provided advanced warning of failure. The actual failures (measured) were observed between the failure prediction obtained from trending the mean peaks and 95% cumulative peak values.

It is to be understood, that in the implementation of the algorithmic analysis of this invention, data will be collected from sensors and by computer, the data sets binned and various statistical calculations carried out, with the results compared to a predetermined failure model. In the one case, the computer can comprise a microprocessor, associated memory and related supported electronic components, and in another embodiment be physically resident with the part/article of manufacture. The computer can also be a stand-alone computer, distant to the monitored part, but periodically connected to the part either wirelessly, or through wired interconnections. The particular mode of operation does not constitute a part of this invention, and this and other various modes of operation as well, will be obvious to those of skill in the art.

The computer, in making these calculations and comparisons can also be preprogrammed to flag a condition which according the failure model is indicative of part/component failure. The flag can comprise an audible tone, an email, a print out, a combination of these, and other methods of communication. The decision as to which statistical analysis to be used for a particular part will be empirically determined on a case by case basis, by doing case studies as reported above, and then testing the data, investigating the results of the application of various statistical features such as one or more of those as set forth at Table 1, and assessing from the results which analysis affords the best, most reliable indication of failure prediction.

While the foregoing is directed to embodiments of the present invention, other and further embodiments of the invention may be devised without departing from the basic scope thereof, and the scope thereof is determined by the claims that follow.

What we claimed is:

1. A computer based parameter extraction method for analyzing the environmental and/or operational exposures of a product or article of manufacture, comprising the steps of:
   (a) detecting irregular changes over time in the environmental and operational loads for said product or article of manufacture and recording said changes in the memory of a computer as raw load data;
   (b) electronically calculating with the aid of said computer the cyclic range, cyclic mean, ramp rates, dwell times, dwell loads and their correlations from said recorded raw load data and storing the calculated values in said computer memory; and thereafter,
   (c) discarding from said computer memory the individual pieces of raw load data previously recorded.

2. The method of claim 1 including the further steps of:
   (a) electronically calculating optimal bin-widths using historic load data to reduce the error between the true density and the estimated density of the load values; and,
   (b) storing in said computer memory the load parameters in bins of optimal bin width to achieve further reductions in data storage.

3. The method of claim 1 in which the load parameters are used by a failure model to assess the health of the product or article of manufacture and predict its remaining life.

4. A computer assisted method for collecting and storing load parameter data derived from raw environmental and operational exposure sensor data, and thereafter analyzing such collected raw data whereby said collected raw data is discarded following analysis and storage of the results, the method comprising:
   selecting an article of manufacture to be monitored;
   associating one or more sensors with said article of manufacture, whereby said one or more sensors are capable of sensing environmental or operational load conditions to which the article of manufacture is subjected to over time;
   collecting raw sensor data over time and storing the said collected data as load data in the electronic memory of a computer, the period of time between the taking of sensor readings predetermined;
   periodically subjecting the stored raw load data to a data reduction process, in which the data is converted to other values, and the raw data then discarded, said data reduction process including the steps of;
   processing, with the aid of said computer, the raw data which has been stored in memory, using a moving average filter to remove noise;
   conducting a computer directed scan of the processed data to identify those collections of data points where the sensed load condition is either continuously increasing, decreasing or dwells at a constant value;
   identifying all dwell time data regions, and storing in the computer memory a matrix of dwell times along with the associated constant load level data for each dwell region;
   electronically performing a correlation calculation on said identified dwell time region data whereby correlations between dwell time and load level at dwell are calculated and stored in said electronic memory;
   electronically processing the remaining raw data sets which now consists of continuously increasing and decreasing data sets, and with the aid of said computer, identifying full and half cycles, identifying the cyclic range for each identified cycle, and electronically calculating the mean load, ramp-up rate and ramp-down rate for each cyclic load;
   storing in said electronic memory the identified cyclic range, and calculated mean load, and ramp up rate and ramp down rate for each cyclic load; and,
   deleting said stored and processed raw data.

5. The computer assisted method of claim 4 wherein said identified and calculated stored load parameter values are thereafter stored in data bins based of optimal bin widths, both the bin widths and the frequency of stored load parameter values assigned to each bin recorded and stored in said electronic memory.

6. The computer assisted method of claim 5 wherein said optimal bin width is based on estimates of standard deviation and sample size from historic sensor data.

7. The computer assisted method of claim 4 wherein the one or more sensors are embedded in the article of manufacture.

8. The computer assisted method of claim 4 wherein the one or more sensors are autonomous sensors retrofitted to the article of manufacture.

9. The computer assisted method of claim 4 wherein a predetermined failure model exists for the article of manufacture.

10. The computer assisted method of claim 4 wherein the predetermined interval of time for recording a raw data sensor reading is selected from the group comprising seconds, fractions of a second, minutes, hours, and days.

11. The computer assisted method of claim 4 wherein the at least one of said load parameters is temperature.

12. The computer assisted method of claim 4 wherein, in addition to the identified dwell regions of constant load level, data regions of small cycles with a constant or near constant mean and data regions of relatively large cycle with an extremely slow ramp rate are classified as dwell regions, and stored.

13. The computer assisted method of claim 4 wherein the correlation calculation of dwell time vs. load at dwell is performed at the time that the dwell time data is identified and stored, and the raw dwell time data is then discarded prior to performing the next data reduction step.

14. An electronic module for monitoring the environmental conditions to which an article of manufacture is exposed, and predicting when that component might fail, said module comprising:
 (a) one or more environmental, operational or performance sensors;
 (b) electronic memory means for periodically recording and storing the sensor readings;
 (c) software means for processing said sensor readings whereby based on the sensor readings, load parameters are calculated, the sensor readings themselves thereafter discarded; and,
 (d) prognostic software means for monitoring and assessing damage conditions to predict remaining useful life based on current conditions and predictions of future use based on historic load data.

15. The electronic module of claim 14 wherein the environmental sensors include one or more sensors to monitor conditions selected from the group comprising strain, temperature, acceleration, and humidity.

16. A computer based method for predicting when a product might fail during long term usage, said method including the steps of:
 (a) continuously monitoring various environmental and/or operational parameters of said product;
 (b) electronically monitoring one or more product performance parameters;
 (c) providing an electronic model in software describing the relationship between the environmental and/or operation parameters monitored and the performance parameters for said product;
 (d) determining the performance drift of the product by calculating the difference between the performance parameter estimated by the model for a particular set of environmental and/or operational parameters and the actual performance parameter observed;
 (e) analyzing according to said software model statistical features from the distributions of performance drift;
 (f) analyzing the trend of said statistical features to determine according to the software model the onset of degradation and assessing the health of the product; and,
 (g) thereafter trending by the computer said statistical features to project when the trend line will meet the defined failure criteria, and thus estimate remaining product life.

17. A computer assisted method of failure prediction of an article of manufacture in use and exposed to various load parameters including environmental and operational parameters, including the steps of:
 selecting an article of manufacture to be monitored for health assessment;
 selecting one or more load factors to be monitored as well as a performance parameter to be monitored;
 monitoring and recording the selected performance parameter and the one or more load factors on a periodic basis, storing the monitored data in an electronic memory;
 using a predetermined operational model for the selected article of manufacture, electronically, calculating an expected value of the performance parameter at each point in time that the preselected load factor is sampled, and storing said calculated value in electronic memory;
 electronically comparing the monitored value of the selected performance parameter to the calculated expected value, the difference between the calculated and expected values representing the degree of performance parameter drift, which drift value is stored in electronic memory;
 periodically electronically subjecting the drift values to one or more statistical feature analysis calculations to establish drift trend over time;
 electronically extrapolating the drift trend over time to that time at which the article of manufacture, by pre established criteria derived from historical failure data, is deemed to have reached the point of failure; and,
 thereafter determining from said extrapolated data if the article of manufacture is likely to fail earlier or later than the predicative model for said article.

18. The method of failure prediction of claim 17 wherein at said time of failure, a failure threshold for the performance parameter being monitored is also defined.

19. The method of failure prediction of claim 18 wherein failure of the article of manufacture is determined to be that time at which the trend line of the performance parameter indicates that the failure threshold for that parameter will be reached.

20. The method of failure prediction of claim 17 wherein a warning is issued if the extrapolated data indicates a failure of the article prior to the time of defined failure.

21. The method of failure prediction of claim 17 wherein the selected statistical analysis method applied is the 95% cumulative peaks analysis.

22. The method of failure prediction of claim 17 wherein after a set number of sampling periods have occurred, a feature analysis is performed on said stored data, an extrapolation of the results of the analysis performed, and the stored raw data used for the said calculations then discarded.

* * * * *